United States Patent
Sato et al.

(10) Patent No.: US 8,189,252 B2
(45) Date of Patent: May 29, 2012

(54) LIGHT DEFLECTING DEVICE AND HOLOGRAM DEVICE

(75) Inventors: Makoto Sato, Tsurugashima (JP); Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 490 days.

(21) Appl. No.: 12/443,612

(22) PCT Filed: Nov. 1, 2006

(86) PCT No.: PCT/JP2006/321846
§ 371 (c)(1),
(2), (4) Date: Mar. 30, 2009

(87) PCT Pub. No.: WO2008/053546
PCT Pub. Date: May 8, 2008

(65) Prior Publication Data
US 2010/0027086 A1 Feb. 4, 2010

(51) Int. Cl.
*G02B 26/08* (2006.01)
(52) U.S. Cl. ................. 359/205.1; 359/212.1
(58) Field of Classification Search ............ 359/22, 359/30, 35, 201.1, 201.2, 205.1, 207.7, 212.1, 359/213.1, 214.1, 221.1
See application file for complete search history.

(56) References Cited

U.S. PATENT DOCUMENTS

| | | | | |
|---|---|---|---|---|
| 5,502,581 A * | 3/1996 | Sudo et al. | ...... | 359/10 |
| 5,877,873 A * | 3/1999 | Bashaw et al. | ...... | 359/10 |
| 6,072,608 A * | 6/2000 | Psaltis et al. | ...... | 359/22 |
| 6,459,484 B1 * | 10/2002 | Yokoi | ...... | 356/318 |
| 6,906,838 B2 * | 6/2005 | Hoen et al. | ...... | 359/201.2 |
| 7,561,317 B2 * | 7/2009 | Weir | ...... | 359/201.1 |
| 7,920,213 B2 * | 4/2011 | Oettinger et al. | ...... | 348/739 |
| 2003/0179426 A1 * | 9/2003 | Ide | ...... | 359/196 |

FOREIGN PATENT DOCUMENTS

| | | |
|---|---|---|
| JP | 06-118323 | 4/1994 |
| JP | 11-234547 | 8/1999 |
| JP | 2004-069722 | 3/2004 |
| JP | 2005-106894 | 4/2005 |
| JP | 2005-310308 | 11/2005 |

* cited by examiner

*Primary Examiner* — Frank Font
(74) *Attorney, Agent, or Firm* — Drinker Biddle & Reath LLP

(57) ABSTRACT

A light deflecting device is a light deflecting device for deflecting an incident light beam and has: a coarse motion light deflecting device which has an optical system having at least two conjugate points on an optical axis and deflects the light beam which has passed through one conjugate point and has entered the optical system as an output light beam which passes through the other conjugate point and has a deflection angle with respect to the optical axis while changing its transmitting direction; and a fine motion light deflecting device which is arranged in the optical system, applies a deflection to the incident light beam, and changes the deflection angle of the output light beam to a second deflection angle different from the deflection angle for a predetermined time.

9 Claims, 40 Drawing Sheets

LIGHT DEFLECTING DEVICE AND HOLOGRAM DEVICE

TECHNICAL FIELD

The invention relates to a hologram device for a hologram recording medium such as optical disc or optical card to/from which information can be recorded or reproduced by irradiating a light beam and, further, to a light deflecting device for use in a hologram device of an angle multiplexing system or the like.

BACKGROUND ART

Attention is paid to a hologram which can record 2-dimensional data such as an image at a high density for high density information recording. The hologram has such a feature that a wave front of signal light which holds recording information is recorded onto a hologram recording medium by using an optical interference pattern with reference light as a diffraction grating. That is, an optical path of the reference light and that of the signal light are spatially separated and both of them are intersected in the hologram recording medium so as to be interfered, thereby recording the information.

By multiplex recording the optical interference patterns onto the hologram recording medium, a recording capacity can be remarkably increased. For example, in an angle multiplexing system, in the hologram recording medium upon recording, by changing an angle of the reference light to the signal light (also referred to an intersection angle) little by little and maintaining the angle for a predetermined time, the recording information which differs every angle can be multiplex recorded into the same area.

As shown in FIG. 1, in the case of executing the angle multiplex recording for recording a plurality of holograms to a same position on a hologram recording medium 2 while changing intersection angles Q1 to Qn of reference light RB1 to RBn for signal light SB1 to SBn which enter perpendicularly the hologram recording medium 2, an incident angle of the reference light is not continuously changed but it is necessary to repeat such an operation that the incident angle is fixed to a predetermined angle only for a time that is required for the recording at the intersection angle Q1, thereafter, is changed up to the intersection angle Q2 and fixed to a predetermined angle, subsequently, is moved up to the intersection angle Q3 and fixed to a predetermined angle, and holograms HG1 to HGn (diffraction gratings) are written.

For example, there is a method whereby by allowing a mirror for the reference light to execute the rotation and translation motion, the angle of the reference light which is irradiated to the hologram recording medium 2 is changed (refer to Patent Document 1).

There is also a method whereby by combining a galvano mirror and a telecentric optical system, the angle of the reference light is changed (refer to Patent Document 2).

When the angle multiplex recording of the holograms is executed, since an irradiation angle of the reference light is swung around a recording position of the hologram as a center, generally, in the hologram device of the angle multiplexing system, a light deflecting device constructed by what is called a 4f optical system and a galvano mirror GM is used as a mechanism for changing the angle of the reference light which is irradiated to the hologram recording medium. For example, as shown in FIG. 2, in the telecentric optical system in which a first lens L1 and a second lens L2 whose focal distances are equal (f1=f2) are arranged in a straight line on an optical axis, they are arranged so that a focal point at one end of the first lens L1 and that of the second lens L2 coincide, a rotary axis of the galvano mirror GM is arranged at the lens focal point (conjugate point) at one end, and the hologram recording medium 2 is arranged at the lens focal point (conjugate point) at the other end.

Patent Document 1: Japanese patent kokai No. 2004-69722
Patent Document 2: Japanese patent kokai No. 2005-310308

DISCLOSURE OF INVENTION

Problem to be Solved by the Invention

In the case of changing the angle by moving the mirror as shown in Patent Documents 1 and 2, in order to fix the angle of the reference light to a predetermined angle, it is necessary to successively repeat such an operation that the mirror in the rest state is suddenly moved to a next angle (at a high speed) and set into a predetermined rest state and, subsequently, moved and set into a rest state, a load on a driving mechanism is also large, and it is also difficult to allow the high speed operation to be executed.

As a subject to be solved by the invention, a subject to provide a light deflecting device and a hologram device which can reduce a load on a mirror driving mechanism can be mentioned as an example.

Means for Solving the Problem

According to claim 1, there is provided a light deflecting device for deflecting an incident light beam, comprising:
a coarse motion light deflecting device which has an optical system having at least two conjugate points on an optical axis and deflects an incident light beam as an output light beam, wherein the incident light beam has passed through one of the conjugate points and entered the optical system, wherein the optical system makes the output light beam pass through the other one of the conjugate points so as to have a deflection angle with respect to the optical axis while changing a transmitting direction of the light beam; and
a fine motion light deflecting device which is arranged in the optical system to apply a deflection to the light beam entered thereinto so as to change the deflection angle of the output light beam into a second deflection angle which is different from the deflection angle for a predetermined time.

According to claim 11, there is provided a hologram device for recording or reproducing information to/from a hologram recording medium in which an optical interference pattern of reference light and signal light is held as a diffraction grating, comprising:
a light forming section for forming the reference light and the signal light obtained by modulating coherence light according to the recording information from the coherence light;
an interfering section for mutually spatially separating an optical path of the reference light and an optical path of the signal light and allowing one of the optical paths to intersect the other one, thereby allowing the reference light and the signal light to be interfered;
a supporting portion for detachably supporting the hologram recording medium to an intersection point of the optical paths of the reference light and the signal light;
an image detecting section for receiving light diffracted from the diffraction grating of the hologram recording medium when the reference light has been irradiated to the hologram recording medium; and
a light deflecting device for deflecting a light beam of the reference light, wherein the light deflecting device includes a coarse motion light deflecting device which has an optical system having at least two conjugate points on an optical axis and deflects the light beam of the reference light which has passed through the conjugate point on the input side and has entered the optical system toward the conjugate point on the output side which coincides with the intersection point from angle directions of mutually different deflection angles from the optical axis while changing a transmitting direction of the incident light beam, a fine motion light deflecting device which is arranged in the optical system, applies a deflection adapted to counterbalance a change in the transmitting direction to the light beam of the reference light so as to set the light beam of the reference light into a rest state for a predetermined time, and a driving circuit for controlling so as to select the angle direction of the light beam of the reference light when the information is recorded or reproduced to/from the coarse motion light deflecting device and the fine motion light deflecting device.

BRIEF DESCRIPTION OF DRAWINGS

FIG. 12 Graph showing a relation between the deflection angle by the galvano mirror in the light deflecting device and the lapsed time in the embodiment according to the invention.

FIG. 13 Graph showing a relation between the deflection angle by the liquid crystal deflecting element in the light deflecting device and the lapsed time in the embodiment according to the invention.

DESCRIPTION OF REFERENCE NUMERALS

2 . . . Hologram recording medium
10 . . . Light deflecting device
100 . . . Hologram device
CL . . . Collimator lens
FAD . . . Fine motion control circuit
GM . . . Galvano mirror
HP . . . Half mirror prism
IS . . . Image sensor
LCDE . . . Liquid crystal deflecting element
LD . . . Laser light source
MD . . . Reference light mirror driving circuit
OBA . . . First objective lens
OBB . . . Second objective lens
RB . . . Reference light
SB . . . Signal light
SLM . . . Space light modulator

MODE FOR CARRYING OUT THE INVENTION

An example of a hologram device as a first embodiment of the invention will be described hereinbelow with reference to the drawings.

<Hologram Device>

Figure 1:
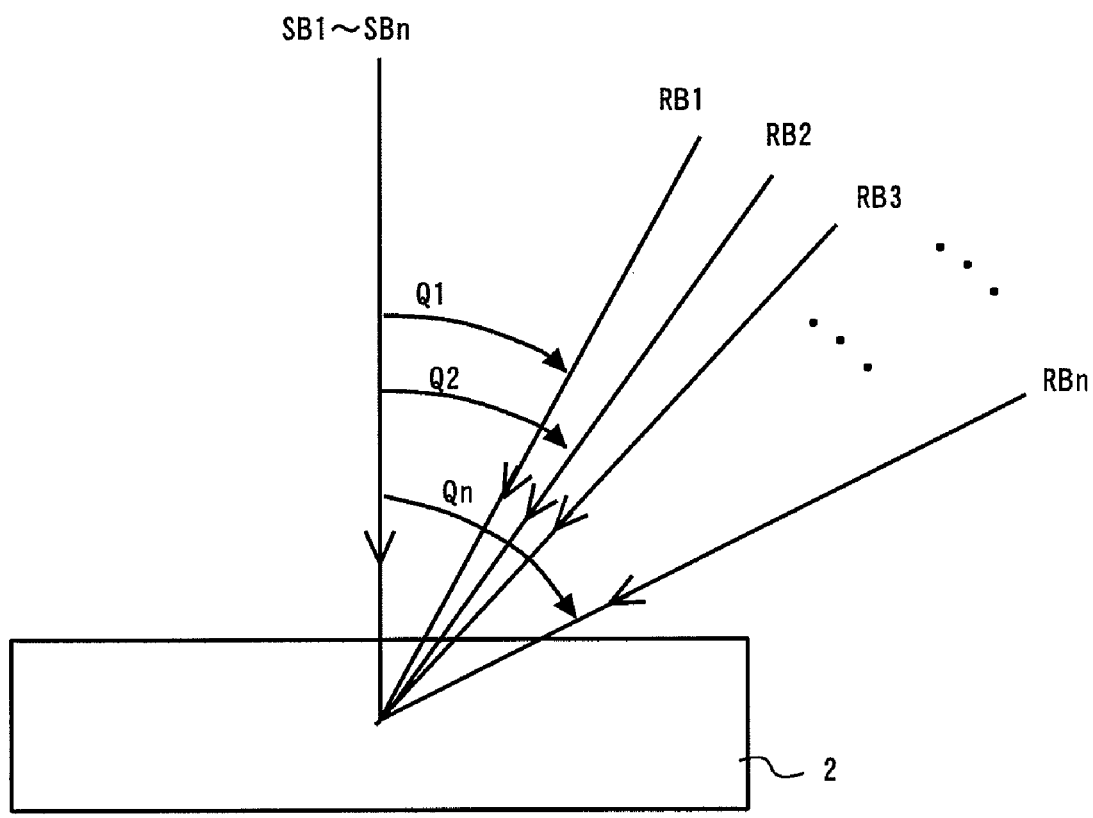
FIG. 1 Schematic partial cross sectional view for explaining a case of changing an angle of light when an angle multiplex recording is executed.
Figure 2:
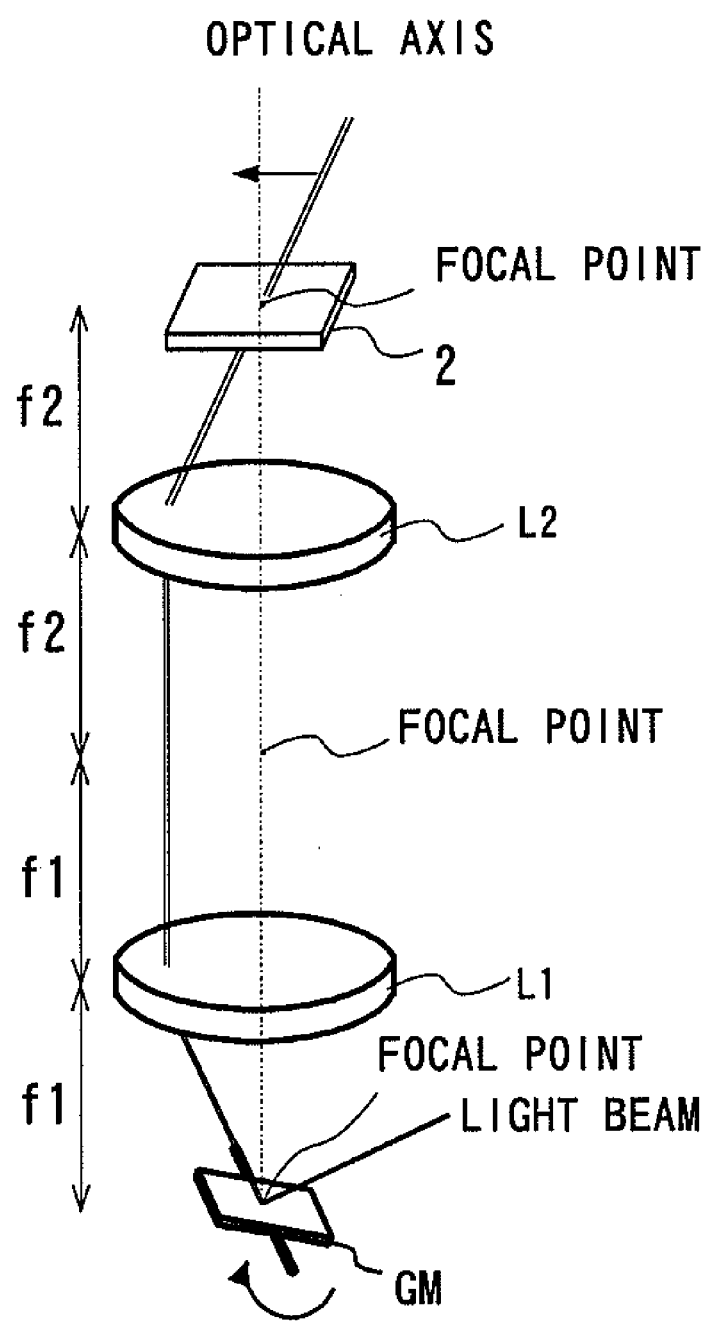
FIG. 2 Schematic perspective view for explaining a telecentric optical system.
Figure 3:
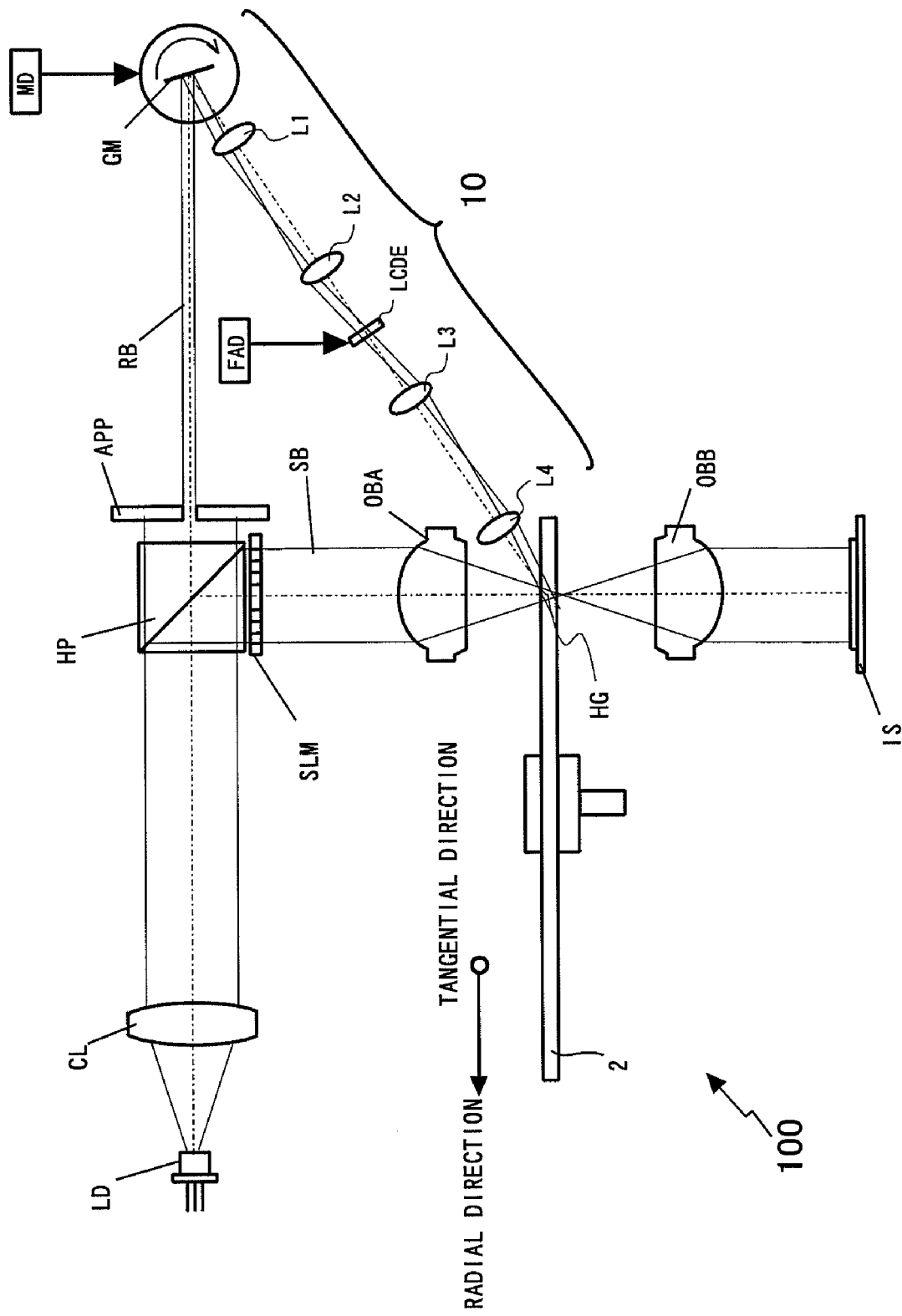
FIG. 3 Constructional diagram showing an outline of a hologram device in an embodiment according to the invention.

FIG. 3 shows a schematic construction of a hologram device 100 using a light deflecting device 10 for recording or reproducing the hologram recording medium 2.

As a recording medium in the hologram recording medium 2, for example, a translucent photosensitive material such as photopolymer, light anisotropic material, photorefractive material, hole burning material, or photochromic material which can preserve an optical interference pattern is used.

The hologram device has a laser light source LD for recording and reproduction of a hologram, a collimator lens CL, and a half mirror prism HP. A wavelength of the laser light source LD is such a wavelength at which the translucent photosensitive material is sensitive and can preserve the optical interference pattern on the hologram recording medium 2. The collimator lens CL converts divergent coherence light from the laser light source LD into parallel light. The half mirror prism HP separates the parallel light in the rectangular direction, thereby forming light beams for reference light and signal light (alight forming section, an interfering section).

The hologram device has the light deflecting device 10 and an aperture APP (a light forming section, an interfering section) as an optical system for the reference light. The light deflecting device 10 includes: a coarse motion light deflecting device including the galvano mirror GM, a lens of a 4f optical system, and the like; and a fine motion light deflecting device such as a transmitting type liquid crystal deflecting element LCDE. The galvano mirror GM is driven by a reference light mirror driving circuit MD for controlling an actuator for driving its rotary axis. The liquid crystal deflecting element LCDE has a function for changing, that is, deflecting the transmitting direction of the light beam which transmits the element LCDE and is driven by a fine motion control circuit FAD.

As shown in FIG. 3, as for the 4f optical system, a first lens L1, a second lens L2, a third lens L3, and a fourth lens L4 are arranged in a straight line on its optical axis so that focal points of the adjacent lenses coincide mutually (confocal point), the rotary axis of the galvano mirror GM is arranged at a lens focal point (conjugate point) at one end, and the hologram recording medium 2 is arranged at a lens focal point (conjugate point) at the other end. The liquid crystal deflecting element LCDE is arranged at a focal point (conjugate point) between the second lens L2 and the third lens L3. The liquid crystal deflecting element LCDE will be described in detail hereinafter.

As an optical system for the signal light, the hologram device has a space light modulator SLM and a first objective lens OBA (Fourier transforming lens). In the space light modulator, each of a plurality of pixels divided in a matrix form has a space modulating function for transmitting or light-shielding incident light, and the space light modulator supplies only the necessary signal light which has been space-modulated to the first objective lens OBA by electric control. That is, the space light modulator SLM is connected to its driving circuit (not shown) and modulates the parallel light beam so as to have the distribution based on page data (information pattern of 2-dimensional data such as a light/dark dot pattern on a plane) to be subsequently recorded, thereby forming the signal light.

As an optical system for reproduction, the hologram device has a second objective lens OBB (Fourier transforming lens) which is coaxial with the first objective lens OBA and whose focal point coincides with that of the first objective lens OBA and an image sensor IS (an image detecting section). The image sensor IS functions as an image detecting section for receiving reproduction light which passes from the hologram recording medium 2 through the second objective lens OBB when the reference light has been irradiated to the hologram recording layer. The image sensor IS is a photoelectric converting element constructed by an array of CCDs (charge coupled devices), CMOS (complementary metal oxide semiconductor devices), or the like. The space light modulator SLM, first objective lens OBA, second objective lens OBB, and image sensor IS are arranged as a 4f optical system onto the optical axis of the light beam from the laser light source LD.

The hologram device further has a supporting portion for detachably supporting the hologram recording medium 2 at an intersection point (between the first and second objective lenses) of the optical path of the reference light and the optical path of the signal light.

The operation of the hologram device is as follows.

The divergent light emitted from the laser light source LD is converted into the parallel light beam by the collimator lens CL and separated into two optical paths by the half mirror prism HP.

Upon recording of the hologram, the light branched by the half mirror prism HP enters the space light modulator SLM, is spatially modulated here according to the page data, and becomes signal light SB. The signal light SB enters the objective lens OBA and enters the hologram recording medium 2.

Also upon recording and reproduction of the hologram, the reference light RB is aperture-limited by the aperture APP, converted into the light beam of a proper diameter, and reflected to the hologram recording medium 2 by the galvano mirror GM of the light deflecting device 10. Upon recording of the hologram, the reflected reference light RB passes through the 4f optical system and intersects the signal light SB in the hologram recording medium 2 at one point. In the angle multiplex recording, the reference light is swung around the intersection point as a center so as to have a deflection angle with respect to the optical axis of the 4f optical system of the reference light. The deflection angle is an angle between the deflected light beam and the optical axis of the optical system.

Figure 4:
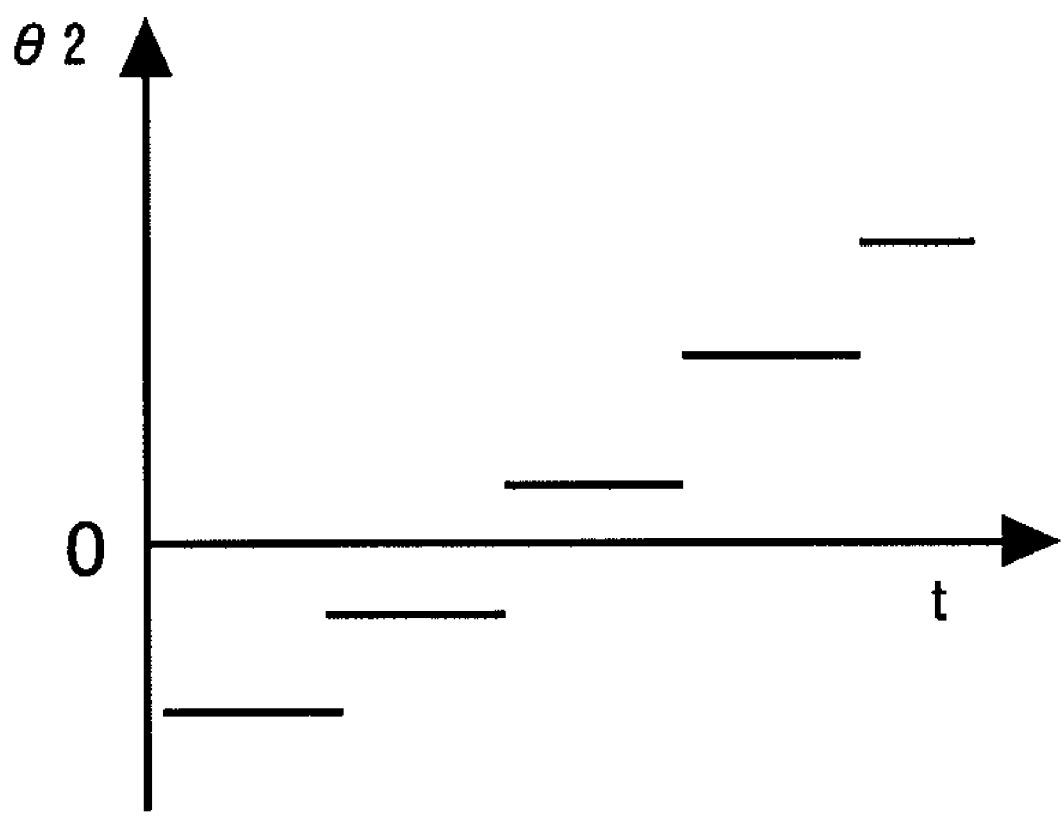
FIG. 4 Graph of characteristics showing a change in deflection angle regarding a time of reference light which is irradiated to a hologram recording medium in a light deflecting device of the embodiment according to the invention.

The reference light RB is rotated around the intersection point as a center by the galvano mirror GM and, at the same time, a deflection adapted to counterbalance a progressing change of the deflection angle of the output light beam is applied by the liquid crystal deflecting element LCDE of the light deflecting device 10, and the reference light RB is fixed and stopped for a predetermined time. A hologram is, thus, angle-multiplexed into the hologram recording medium 2 and a plurality of holograms (book) are recorded. The liquid crystal deflecting element LCDE applies a deflection to the transmitted light beam, thereby allowing a first deflection angle of the output light beam by the galvano mirror GM to be changed to a second deflection angle $\theta 2$ different from the first deflection angle for a predetermined time. That is, by a combination of the rotating galvano mirror GM and the liquid crystal deflecting element LCDE, the deflection angle $\theta 2$ regarding the time of the reference light which is irradiated to the hologram recording medium 2 is changed step by step as shown in FIG. 4.

After a predetermined book was recorded, the hologram recording medium 2 is moved and a book is recorded again into another region.

Upon reproduction of the hologram, by setting the space light modulator SLM into a light shielding state, the irradiation of the signal light SB is stopped, only the reference light RB is made to enter the hologram recording medium 2 at almost the same angle as that upon recording and the signal light is reconstructed only from the hologram corresponding to the incident angle of the reference light RB and formed onto the image sensor IS by the second objective lens OBB. By reading out the reproduction image by the image sensor IS, the signal which has been photoelectrically converted into the page data and recorded is reproduced.

<Light Deflecting Device>

Figure 5:
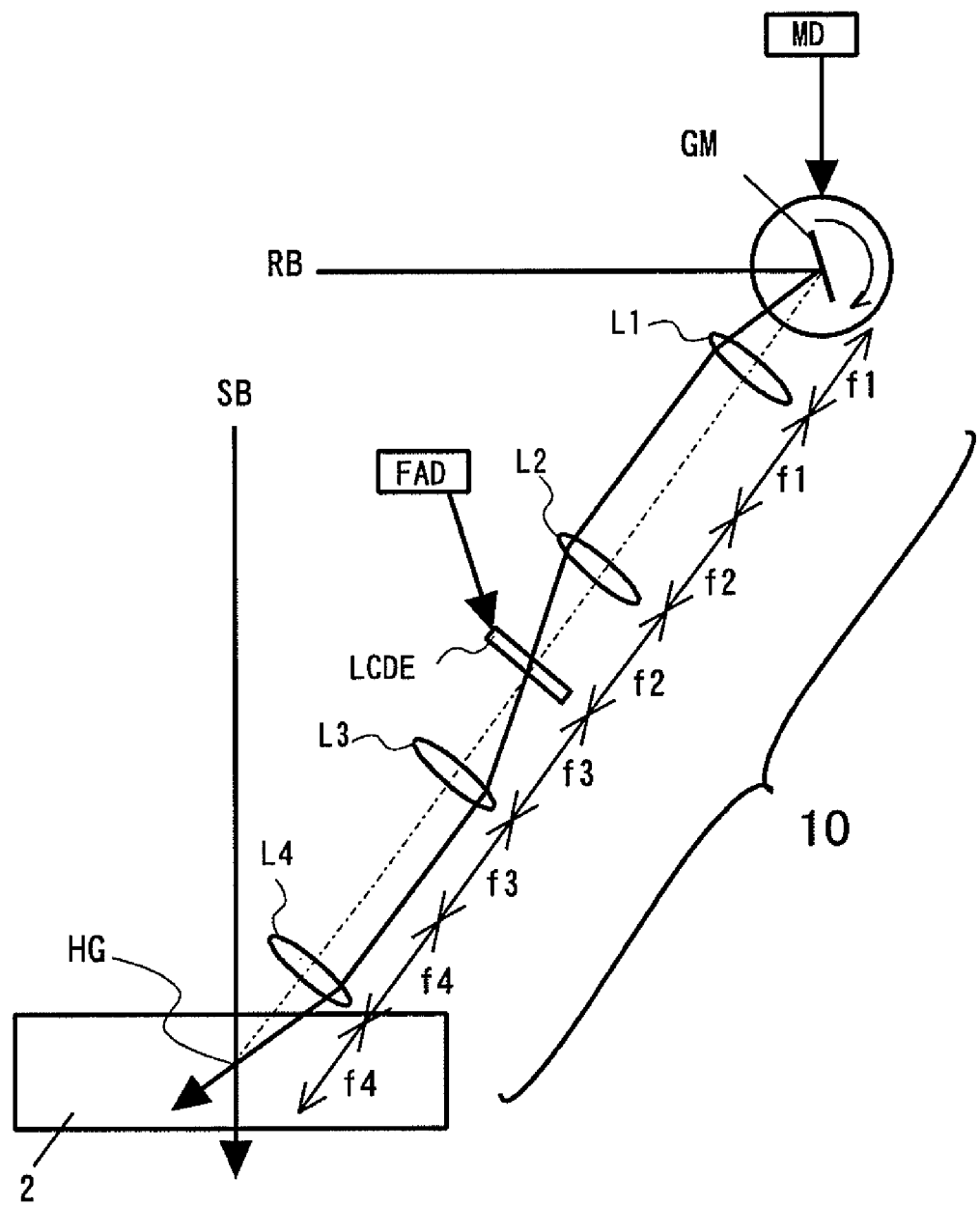
FIG. 5 Constructional diagram showing a light deflecting device of the embodiment according to the invention.

FIG. 5 shows the light deflecting device 10. The light deflecting device 10 is constructed by: the coarse motion light deflecting device constructed by 4f optical system and the galvano mirror GM; and the fine motion light deflecting device such as a liquid crystal deflecting element LCDE.

The coarse motion light deflecting device has, for example, the 4f optical system of the confocal point as mentioned above having at least two conjugate points on the optical axis and allows the light beam of the reference light which has passed through the conjugate point on the input side and has entered the optical system to be deflected from angle directions of the mutually different deflection angles from the optical axis toward the conjugate point on the output side which coincides with the intersection point while changing the transmitting direction of the light beam. As for the first to fourth lenses L1 to L4 in FIG. 5, although the 4f optical system in the case where their focal distances are equal (f1=f2=f3=f4) has been shown as an example, the invention is not limited to it but another confocal point optical system can be also used.

The fine motion light deflecting device such as a liquid crystal deflecting element LCDE is arranged in the optical system, applies the deflection adapted to counterbalance the change in transmitting direction to the light beam of the reference light so as to set the light beam of the reference light into the rest state for the predetermined time.

The light deflecting device 10 further includes: a driving circuit for controlling so as to select the angle direction of the light beam of the reference light when the information is recorded or reproduced to/from the coarse motion light deflecting device and the fine motion light deflecting device, that is, the reference light mirror driving circuit MD for driving the galvano mirror GM; and the fine motion control circuit FAD for driving so as to change, that is, deflect the transmitting direction of the light beam which transmits.

<Fine Motion Light Deflecting Device>

First, a structure and the operation of the liquid crystal deflecting element LCDE of the fine motion light deflecting device will be described in detail.

Figure 6:
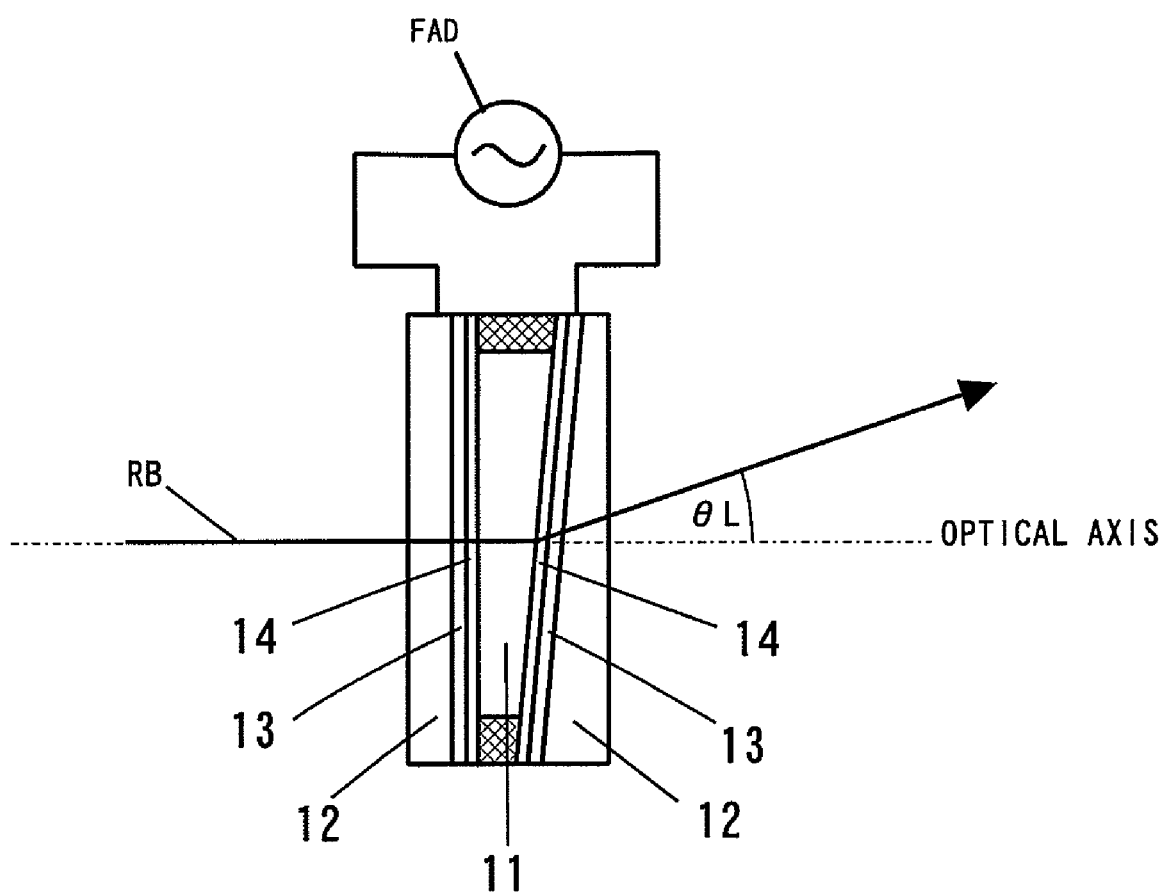
FIG. 6 Cross sectional view showing a liquid crystal deflecting element of the light deflecting device in the embodiment according to the invention.

As shown in FIG. 6, the liquid crystal deflecting element LCDE deflects the light (reference light RB) which entered along the optical axis by a deflection angle $\theta L$ from the optical axis and generates the deflected light.

Figure 7:
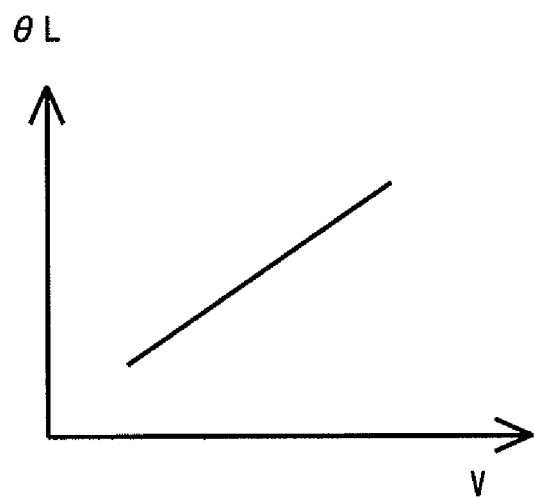
FIG. 7 Graph showing a relation of a deflection angle of a light beam in the liquid crystal deflecting element in the light deflecting device to an applied voltage in the embodiment according to the invention.

For example, the liquid crystal deflecting element LCDE can be realized by sandwiching a liquid crystal layer having a wedge-like cross section by glass substrates through transparent electrodes. As shown in FIG. 6, the liquid crystal deflecting element LCDE is a transmitting type liquid crystal element which is made of a liquid crystal 11 sandwiched through orientation films 14 to transparent electrodes 13 made of indium tin oxide or the like which face each other as inner surfaces of a pair of glass substrates 12 and peripheries of the substrates are sealed. The orientation films 14 which specify a direction (orientation) of an axis of a close liquid crystal molecule can be also omitted. Although the outer surfaces of the pair of glass substrates 12 are parallel planes, the liquid crystal layer is formed so that a cross section of the liquid crystal 11 has an interface in a wedge shape (so that its film thickness is inclined at a predetermined angle from the plane which is perpendicular to the optical axis). As for the film thickness of the liquid crystal layer, the liquid crystal layer is formed so that the side where the deflected light beam (deflection angle) appears from the optical axis is thick and the opposite side is thin. A voltage is applied to the transparent electrodes 13 by the fine motion control circuit FAD. When the applied voltage is changed, a refractive index of the internal liquid crystal changes, so that a refractive angle of the light changes. The light is, consequently, deflected in proportion to an applied voltage V, that is, a degree of deflection (deflection angle θL) of the light beam can be changed (refer to FIG. 7).

By solely using the liquid crystal deflecting element LCDE in place of the galvano mirror GM, the angle of the reference light can be swung without physically moving the element (for example, refer to Japanese patent kokai No. 2003-195274). When the light beam is deflected at a large angle, however, there is a limitation in view of the characteristics of the liquid crystal deflecting element LCDE. If it is intended to increase the deflection angle, it is necessary to increase the film thickness of the liquid crystal layer. Since a response speed is remarkably deteriorated by increasing the film thickness, however, the sufficient deflection angle cannot be satisfied only by the liquid crystal deflecting element LCDE. In order to multiplex a large quantity of information by the angle multiplex, by combining the fine motion light deflecting device such as a liquid crystal deflecting element LCDE in addition to the coarse motion light deflecting device by the galvano mirror GM, the light deflecting device which applies the step-like angle change while allowing the galvano mirror GM to continuously operate can be realized.

The liquid crystal deflecting element LCDE can electrically change the deflection angle without being accompanied with the physical motion in elements other than the liquid crystal molecules.

Figure 8:
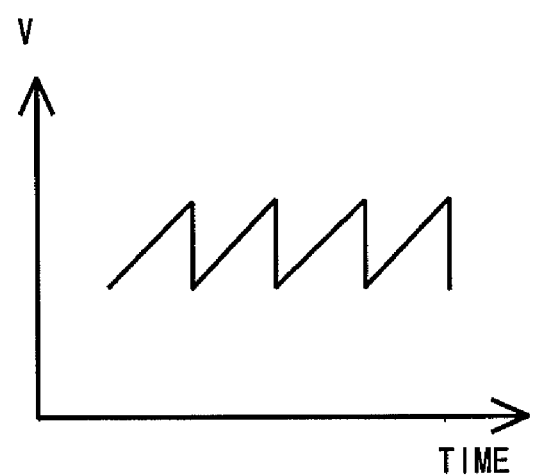
FIG. 8 Graph showing a relation of the applied voltage in the liquid crystal deflecting element in the light deflecting device to a time in the embodiment according to the invention.
Figure 9:
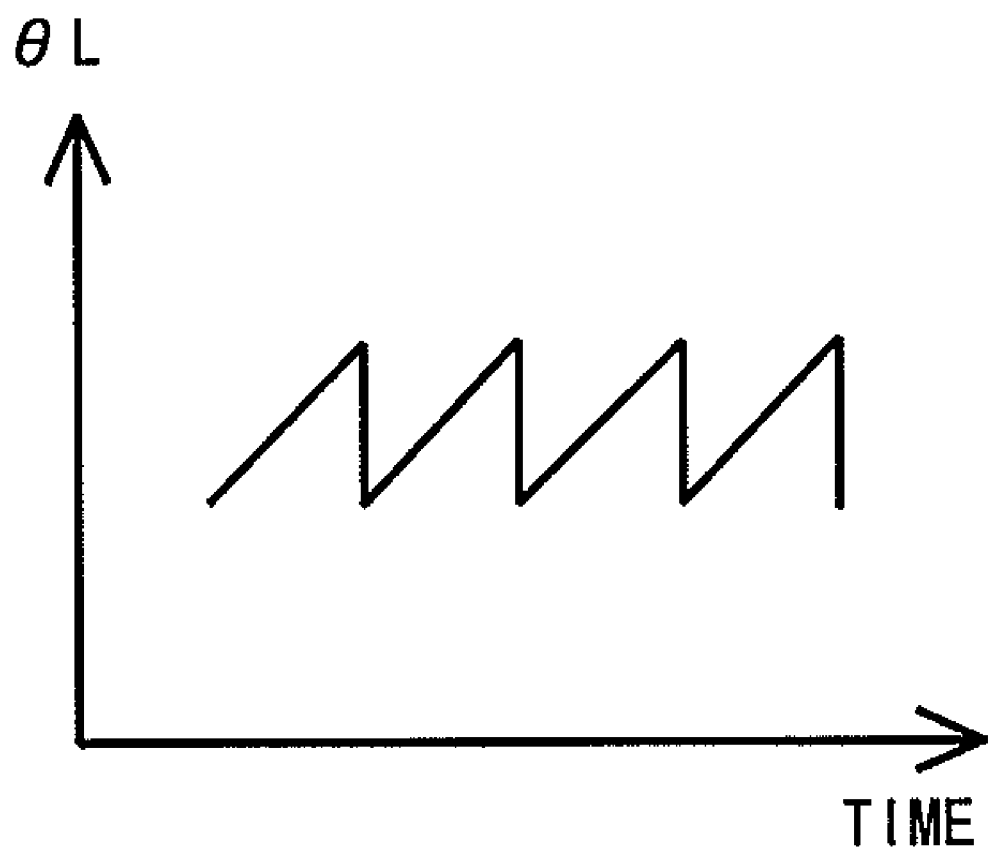
FIG. 9 Graph showing a relation of the deflection angle of the light beam in the liquid crystal deflecting element in the light deflecting device to the time in the embodiment according to the invention.

If the saw-tooth like applied voltage V as shown in FIG. 8 is supplied to the liquid crystal deflecting element LCDE with the lapse of time, the deflection angle θL of the reference light RB can be also changed in a saw-tooth manner with the lapse of time as shown in FIG. 9.

<Coarse Motion Light Deflecting Device>

Subsequently, the operation of the reference light in the case where the galvano mirror GM of the coarse motion light deflecting device and the liquid crystal deflecting element LCDE are combined will be described in detail.

Figure 10:
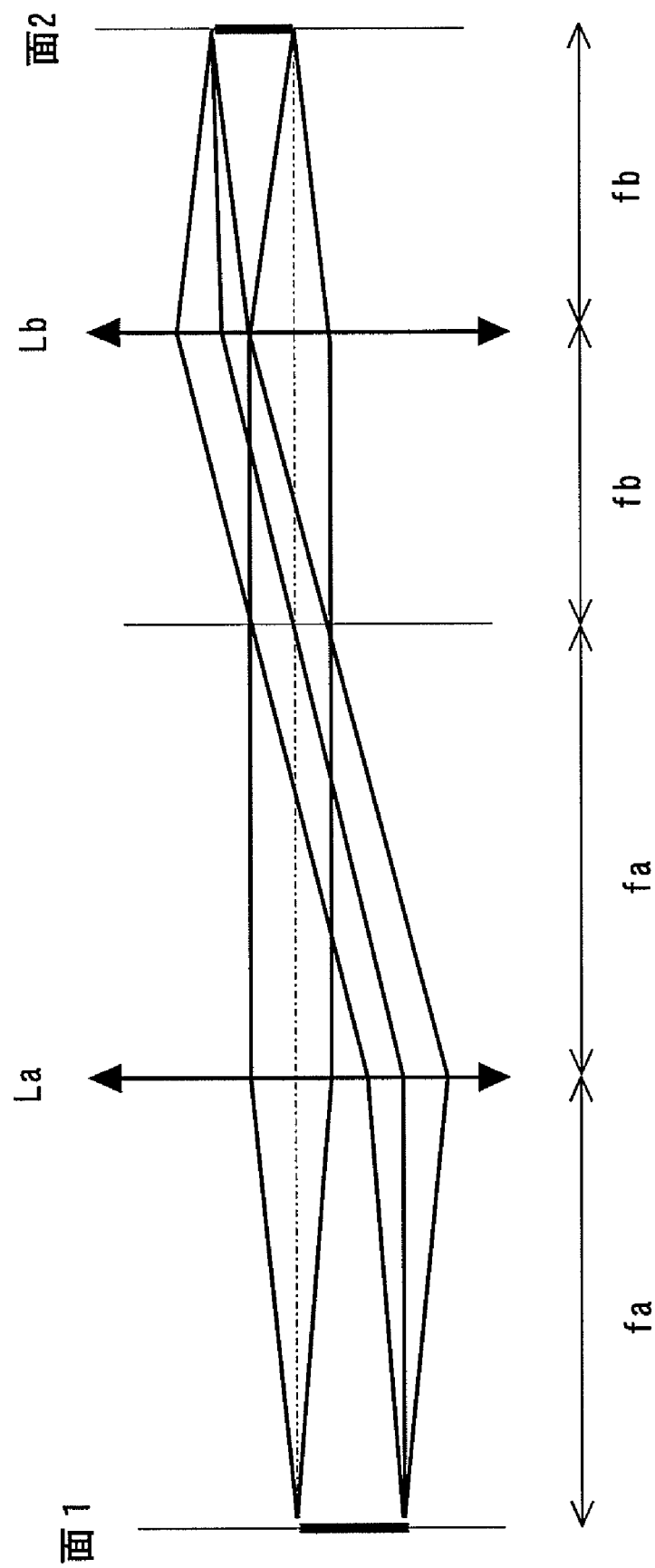
FIG. 10 Schematic constructional diagram showing a 4f optical system.

Generally, in a lens structure of lenses La and Lb having a confocal point as shown in FIG. 10, when focal planes 1 and 2 mutually have an image forming relation of an object and an image, such a construction is called a 4f optical system or 4f system as mentioned above. Symbols fa and fb indicate focal distances of the lenses La and Lb, respectively.

Figure 11:
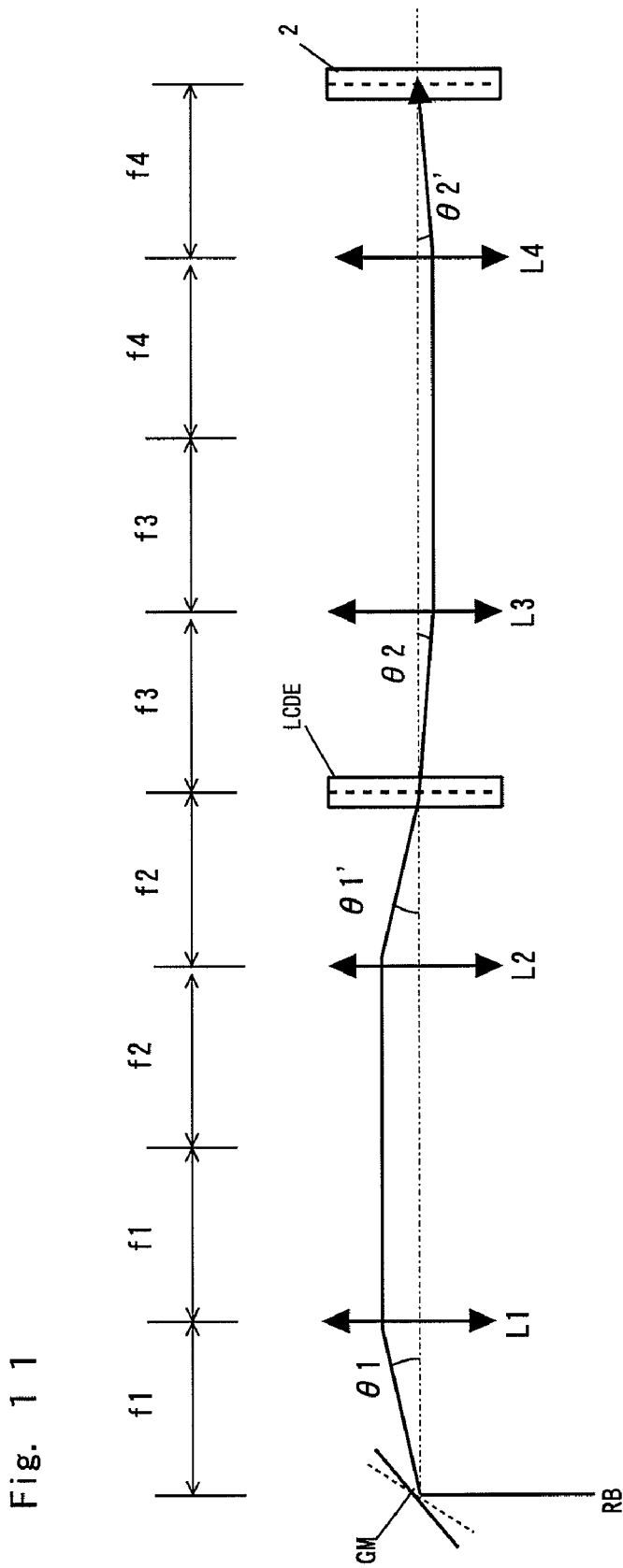
FIG. 11 Diagram showing an optical path diagram of the reference light from a galvano mirror in the light deflecting device to a hologram recording medium in the embodiment according to the invention.
Figure 1:
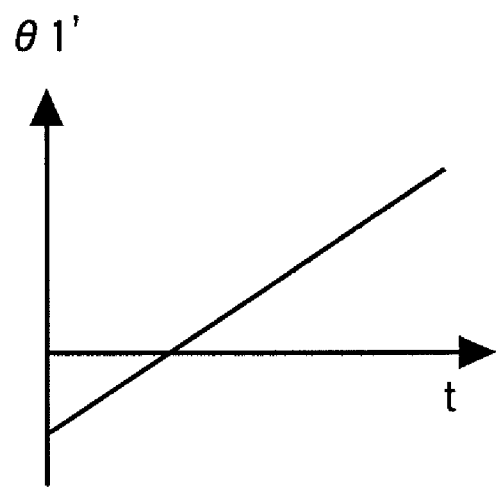
Figure 1:
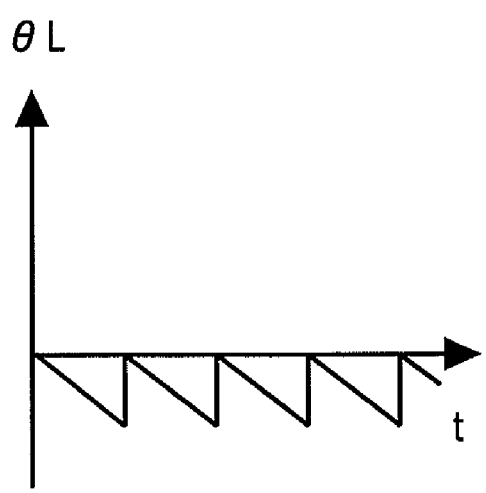

FIG. 11 shows an optical path diagram of the reference light RB from the galvano mirror GM to the hologram recording medium 2.

The reference light RB reflected by the galvano mirror GM enters the first lens L1 having a focal distance f1 at a deflection angle θ1, passes through the second lens L2 having a focal distance f2, and enters the liquid crystal deflecting element LCDE at a deflection angle θ1'. The galvano mirror GM and the liquid crystal deflecting element LCDE are arranged so that their positions mutually satisfy the image forming relation of the 4f system. The light reflected in any direction from the galvano mirror GM is guided to a specific point (conjugate point on the optical axis) on the liquid crystal deflecting element LCDE.

Subsequently, for the light which has transmitted the liquid crystal deflecting element LCDE, the predetermined deflection angle θL is added to the deflection angle θ1' by the liquid crystal deflecting element LCDE, so that the light is deflected to the deflection angle θ2 (second deflection angle). Thereafter, the light passes through the third lens L3 having a focal distance f3 and the fourth lens L4 having a focal distance f4 and is guided to the hologram recording medium 2 at a deflection angle θ2'. The liquid crystal deflecting element LCDE and the hologram recording medium 2 are arranged so as to mutually satisfy the image forming relation of the 4f system. The light emitted in any direction from the liquid crystal deflecting element LCDE is guided to a specific point (intersection point with the signal light) on the hologram recording medium 2. That is, even when the angle of the light beam is swung by the galvano mirror GM, the reference light can be always guided to a certain point on the hologram recording medium 2.

It is now assumed that a rotational angle of the galvano mirror GM is equal to φ and the reflection light progresses on the optical axis when φ=0. The deflection angle θ1 between the reflection light from the galvano mirror GM and the optical axis is twice as large as φ. In a paraxial region, the deflection angle θ1' of the incident light beam into the liquid crystal deflecting element LCDE has a linear relation with the deflection angle θ1. When the galvano mirror GM is rotated at a predetermined speed by the reference light mirror driving circuit MD, there is a linear proportional relation between the incident angle (deflection angle θ1') into the liquid crystal deflecting element LCDE and a time t. FIG. 12 shows the relation between the deflection angle θ1' by the galvano mirror and the lapsed time t.

Figure 14:
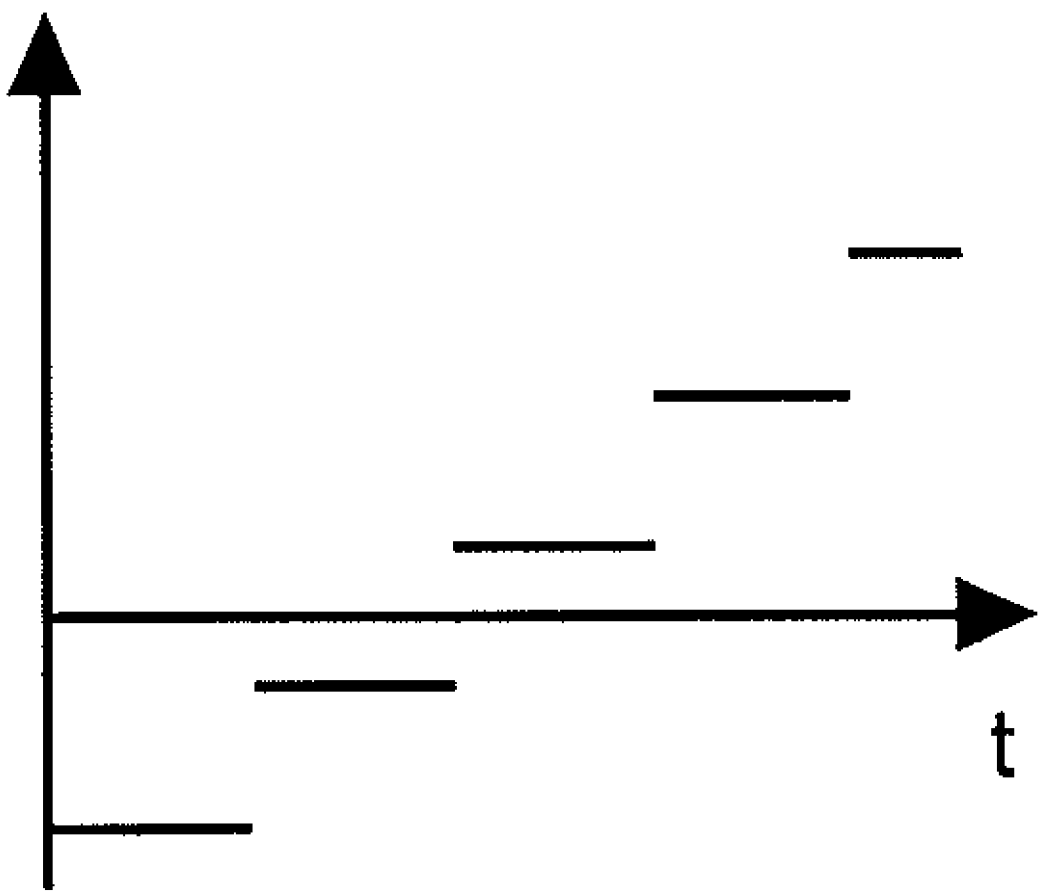
FIG. 14 Graph of characteristics showing a change in deflection angle regarding the time of the reference light which is irradiated to the hologram recording medium in the light deflecting device of the embodiment according to the invention.

The voltage is applied so that the deflection angle θL of the liquid crystal deflecting element LCDE shows a progressing change of the saw-tooth wave shown in FIG. 13. An inclination of a slant surface of the saw-tooth wave in this state is equal to an inclination of the progressing change of the deflection angle θ1' shown in FIG. 12 and has a sign opposite to a sign thereof. The deflection angle θ2 of the reference light which has passed through the liquid crystal deflecting element LCDE, thus, shows a step-like progressing change as shown in FIG. 14. In this manner, the liquid crystal deflecting element LCDE of the fine motion light deflecting device can apply the deflection adapted to counterbalance the progressing change of the deflection angle of the inherent output light beam to the reference light RB and set the output light beam of the reference light RB into a rest state for the predetermined time. If a wavelength (predetermined rest time) of the saw-tooth wave is stored as a reference table into a memory in the fine motion control circuit FAD, the reference light can be driven in a step-like manner synchronously with the rotation of the galvano mirror GM of the coarse motion light deflecting device.

In brief, since the liquid crystal deflecting element LCDE and the hologram recording medium 2 are located at the image forming position, there is a linear relation between the deflection angle θ2' of the light beam which enters the hologram recording medium 2 and the deflection angle θ2 and the angle of the light which enters the hologram recording medium 2 can also obtain the step-like characteristics as shown in FIG. 14.

By the foregoing operation, in the angle multiplexing system hologram recording, the hologram can be stably recorded by maintaining the relative intersection angle of the angle of the signal light SB and the angle of the reference light RB for the predetermined time in the hologram recording medium 2.

As mentioned above, by using the two deflecting devices such as coarse motion light deflecting device and fine motion light deflecting device, the angle of the reference light which enters a certain target point (the hologram recording medium 2) can be swung in a step-like manner within a large angle range. In the coarse motion light deflecting device, the fine motion light deflecting device and the target point are coupled by the image forming relation (conjugate). According to the embodiment, the coarse motion light deflecting device (4f system, galvano mirror, and the like) can linearly change the deflection angle. In addition to that its angle range is large, the fine motion light deflecting device (liquid crystal deflecting element LCDE, and the like) can electrically change the deflection angle in a saw-tooth wave manner without being accompanied with the physical motion in elements other than the liquid crystal.

Other Embodiments

Figure 15:
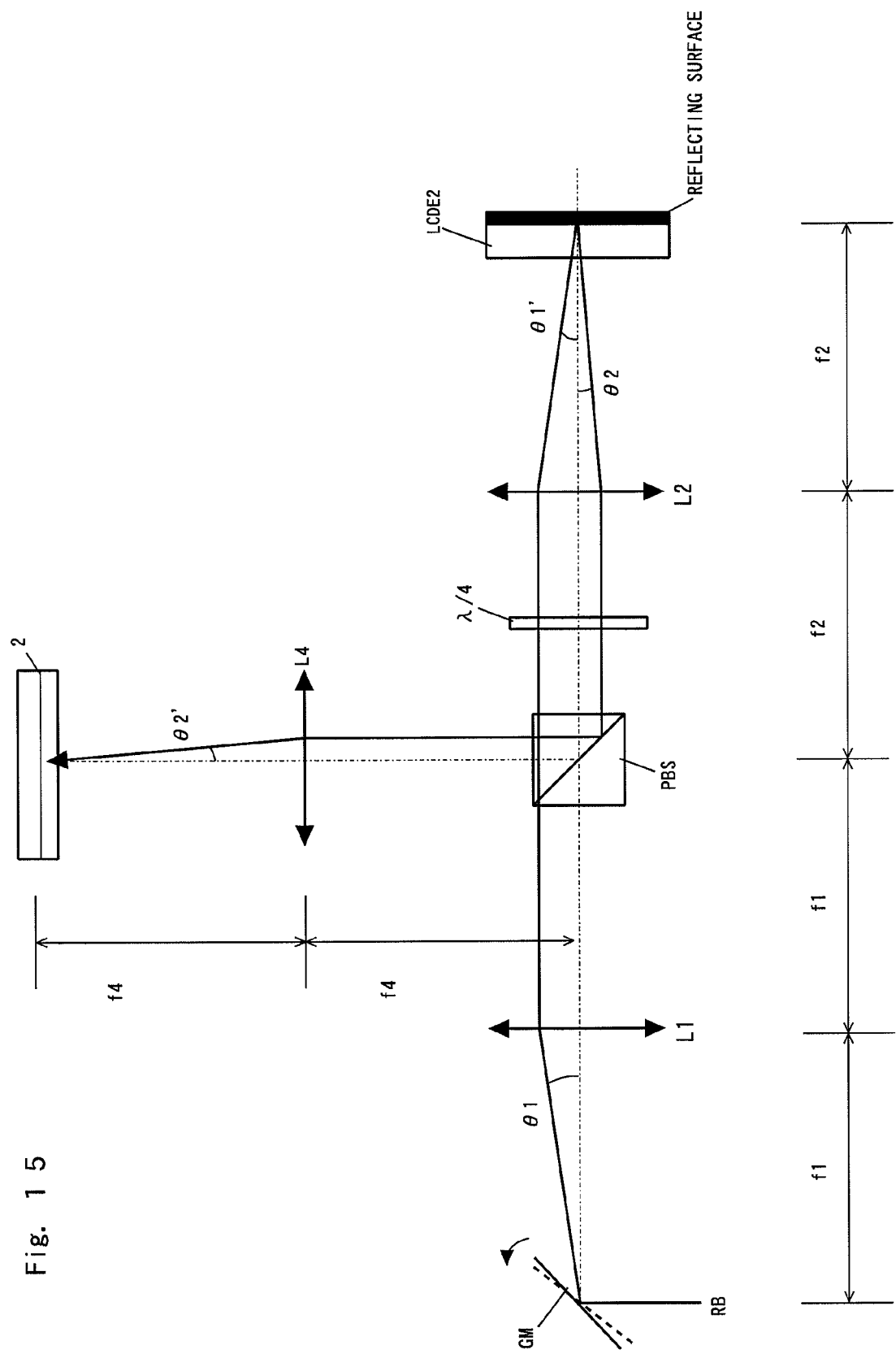
FIG. 15 Diagram showing an optical path diagram of reference light of a light deflecting device of another embodiment according to the invention.

The second embodiment is substantially the same as the foregoing first embodiment except that, as shown in FIG. 15, the transmitting type liquid crystal deflecting element LCDE is replaced by a reflecting type liquid crystal deflecting element LCDE2, the third lens L3 is omitted so that the reference light reciprocates the liquid crystal layer (whose refractive index changes by applying the voltage) at the reflecting surface of the back surface of the liquid crystal deflecting element LCDE2, the second lens L2 is allowed to play a role of the function of the third lens L3, and further, a polarization beam splitter PBS is disposed at the conjugate point between the first and second lenses L1 and L2, a quarter-wave retardation plate λ/4 is arranged between the polarization beam splitter PBS and the second lens L2, the reference light RB is branched by the polarization beam splitter PBS, and the reflection light from the liquid crystal deflecting element LCDE2 is guided to the hologram recording medium 2 through the fourth lens L4. The embodiment has such an advantage that the liquid crystal in the reflecting type liquid crystal deflecting element LCDE2 doesn't need to have the wedge-like cross section and a device structure is simplified.

Figure 16:
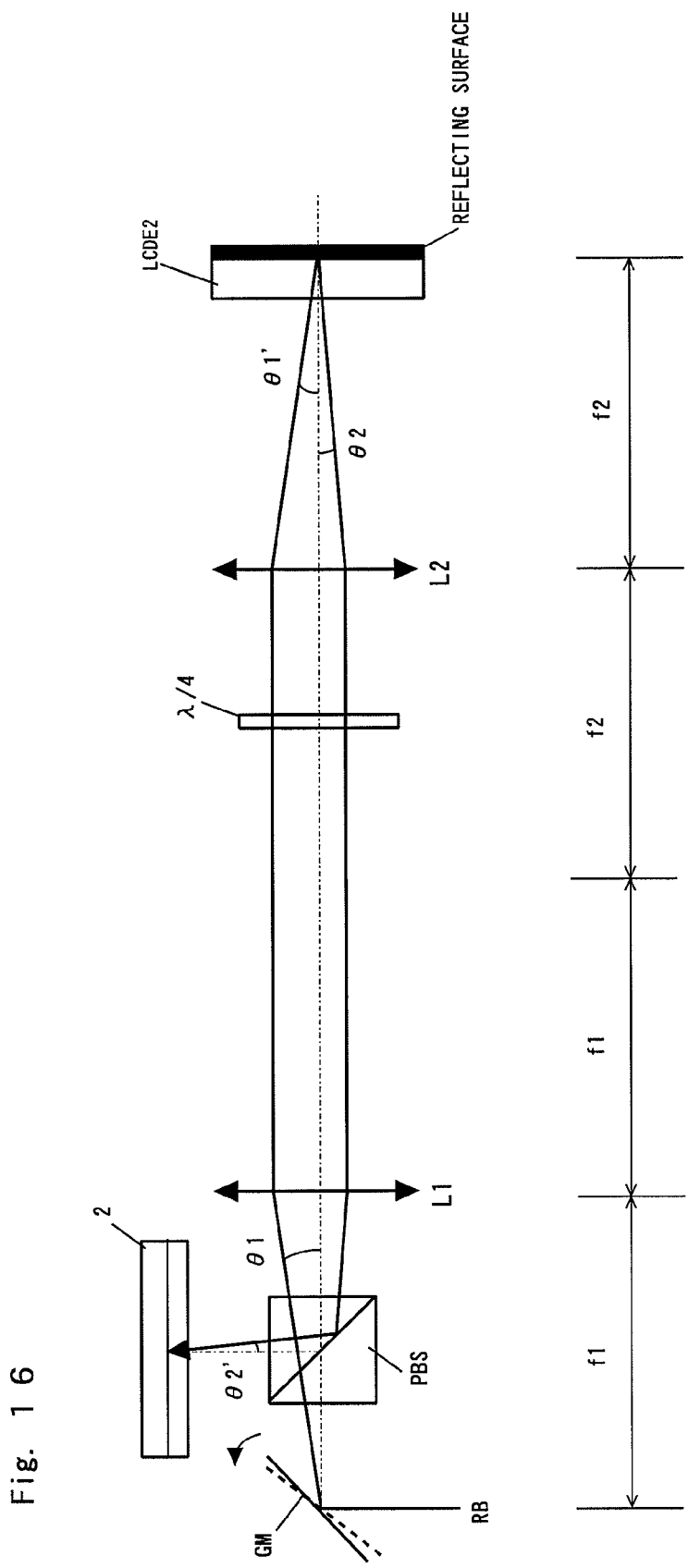
FIG. 16 Diagram showing an optical path diagram of reference light of a light deflecting device of another embodiment according to the invention.

The third embodiment is substantially the same as the foregoing second embodiment except that, as shown in FIG. 16, the polarization beam splitter PBS between the first and second lenses L1 and L2 is moved between the galvano mirror GM and the first lens L1, the fourth lens L4 is omitted, and the reference light RB which has been reflected and is returned from the first and second lenses L1 and L2 is branched by the polarization beam splitter PBS and is directly guided to the hologram recording medium 2. The embodiment has such an advantage that the liquid crystal in the reflecting type liquid crystal deflecting element LCDE2 doesn't need to have the wedge-like cross section and a device structure is simplified.

Figure 17:
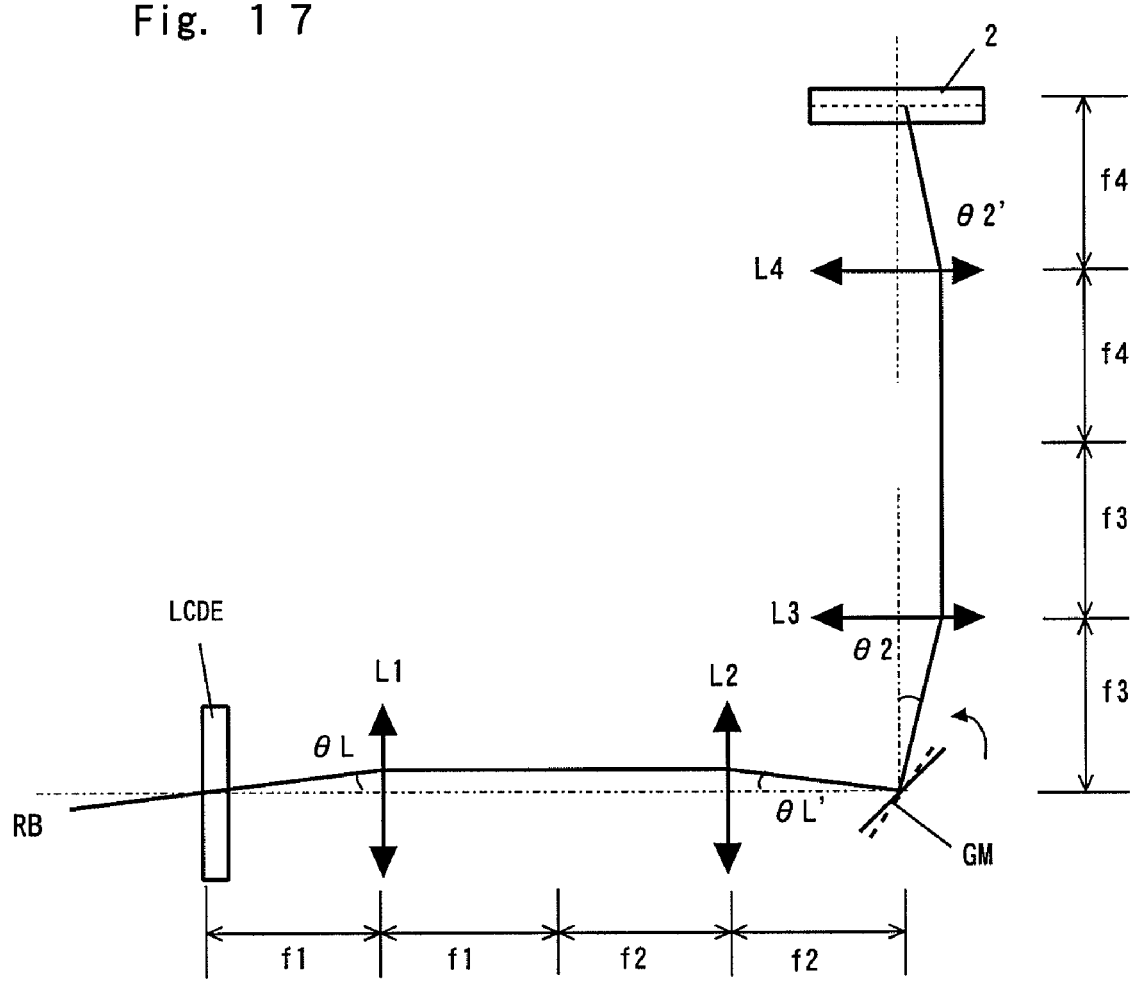
FIG. 17 Diagram showing an optical path diagram of reference light of a light deflecting device of another embodiment according to the invention.

The fourth embodiment is substantially the same as the foregoing first embodiment except that, as shown in FIG. 17, the positions of the galvano mirror GM and the transmitting type liquid crystal deflecting element LCDE in the first embodiment are exchanged and after the reference light passed through the liquid crystal deflecting element LCDE, it enters the galvano mirror GM. The embodiment has such an advantage that since the rotary axis of the galvano mirror GM is arranged at a focal point (conjugate point) between the second and third lenses L2 and L3, a degree of freedom of layout is widened to a range other than the layout on the straight line of the lens group.

Figure 18:
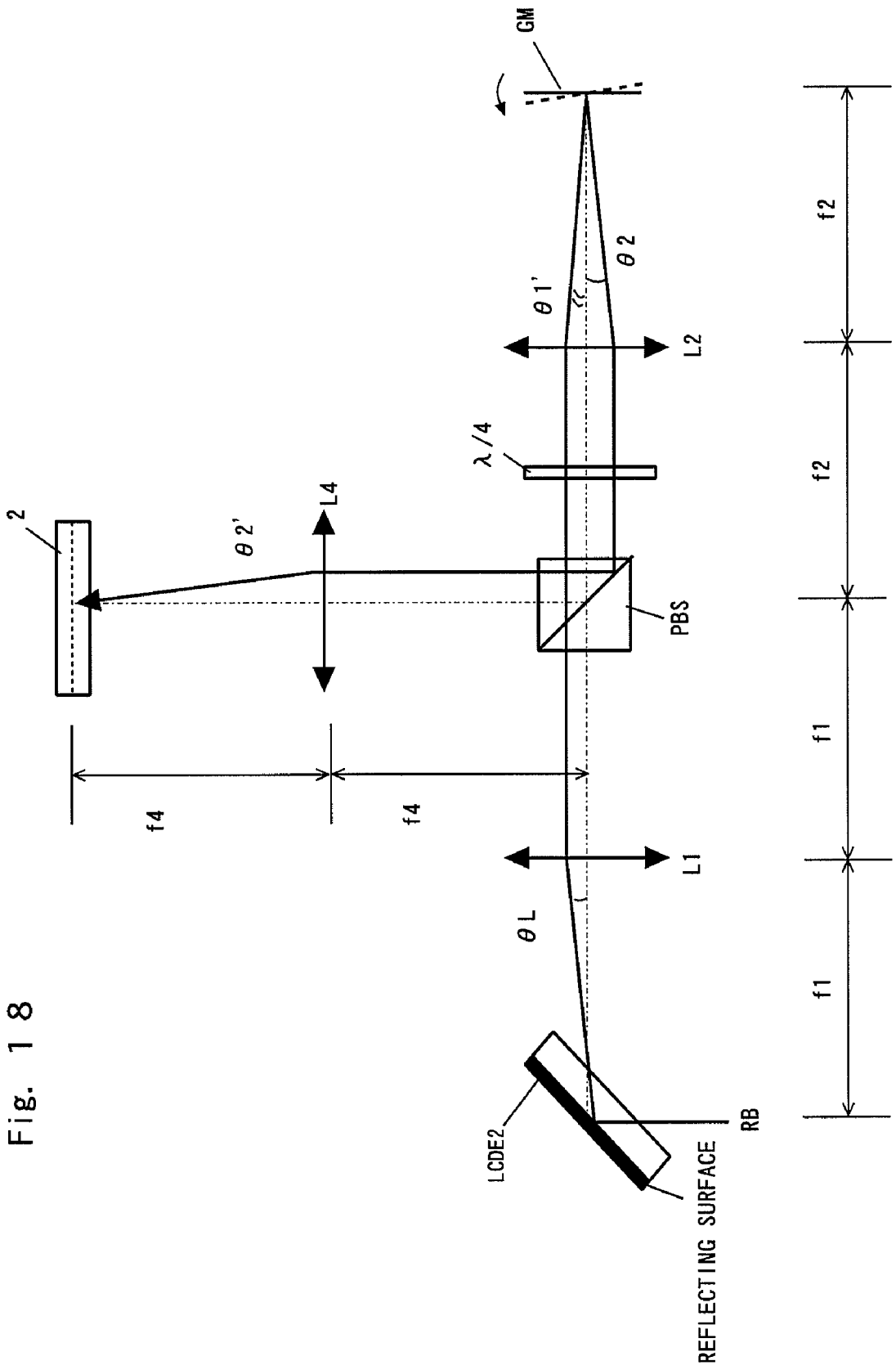
FIG. 18 Diagram showing an optical path diagram of reference light of a light deflecting device of another embodiment according to the invention.

The fifth embodiment is substantially the same as the foregoing fourth embodiment except that, as shown in FIG. 18, the transmitting type liquid crystal deflecting element LCDE in the fourth embodiment is replaced by the reflecting type liquid crystal deflecting element LCDE2, the third lens L3 is omitted so that the reference light passes through the liquid crystal layer (whose refractive index changes by applying the voltage) at the reflecting surface of the back surface of the liquid crystal deflecting element LCDE2, the second lens L2 is allowed to play a role of the function of the third lens L3, and further, the polarization beam splitter PBS is disposed at the conjugate point of the first and second lenses L1 and L2, the quarter-wave retardation plate λ/4 is arranged between the polarization beam splitter PBS and the second lens L2, the reference light RB is branched by the polarization beam splitter PBS, and the reflection light from the galvano mirror GM is guided to the hologram recording medium 2 through the fourth lens L4. The embodiment has such an advantage that the liquid crystal in the reflecting type liquid crystal deflecting element LCDE2 doesn't need to have the wedge-like cross section and a device structure is simplified.

Figure 19:
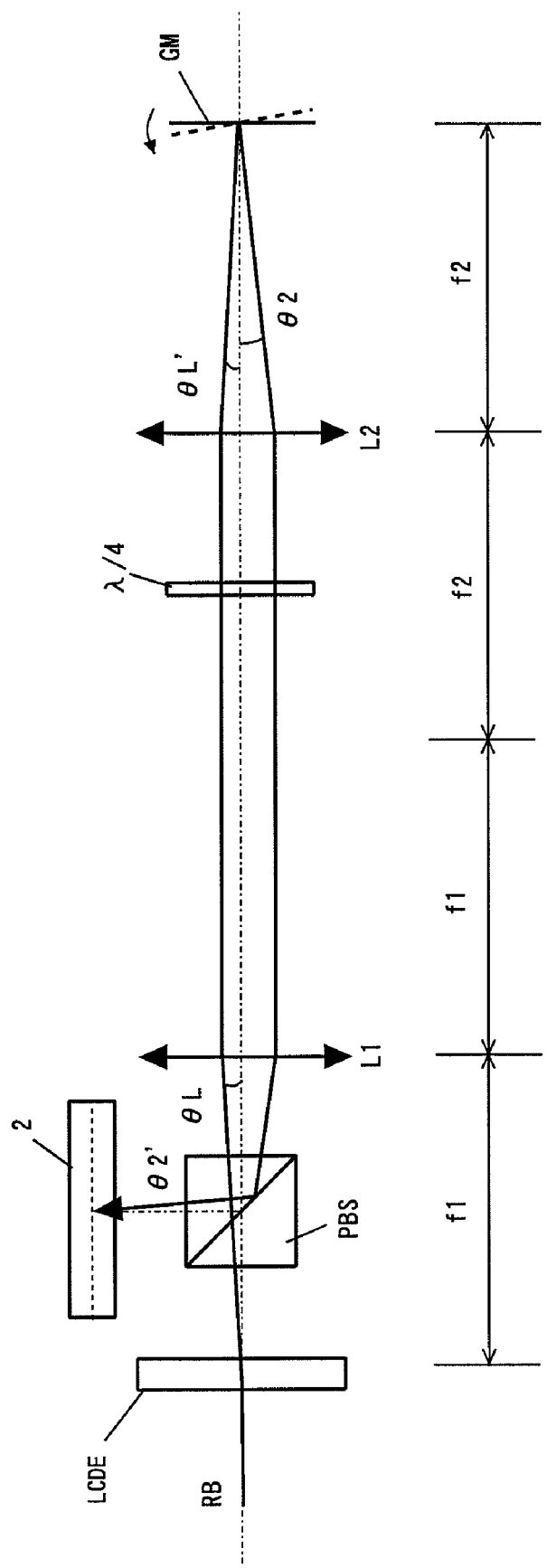
FIG. 19 Diagram showing an optical path diagram of reference light of a light deflecting device of another embodiment according to the invention.

The sixth embodiment is substantially the same as the foregoing fifth embodiment except that, as shown in FIG. 19, the reflecting type liquid crystal deflecting element LCDE2 in the fifth embodiment is replaced by the transmitting type liquid crystal deflecting element LCDE, the polarization beam splitter PBS between the first and second lenses L1 and L2 is moved between the galvano mirror GM and the first lens L1, the fourth lens L4 is omitted, and the reference light RB which has been reflected and is returned from the first and second lenses L1 and L2 is branched by the polarization beam splitter PBS and is directly guided to the hologram recording medium 2.

Figure 20:
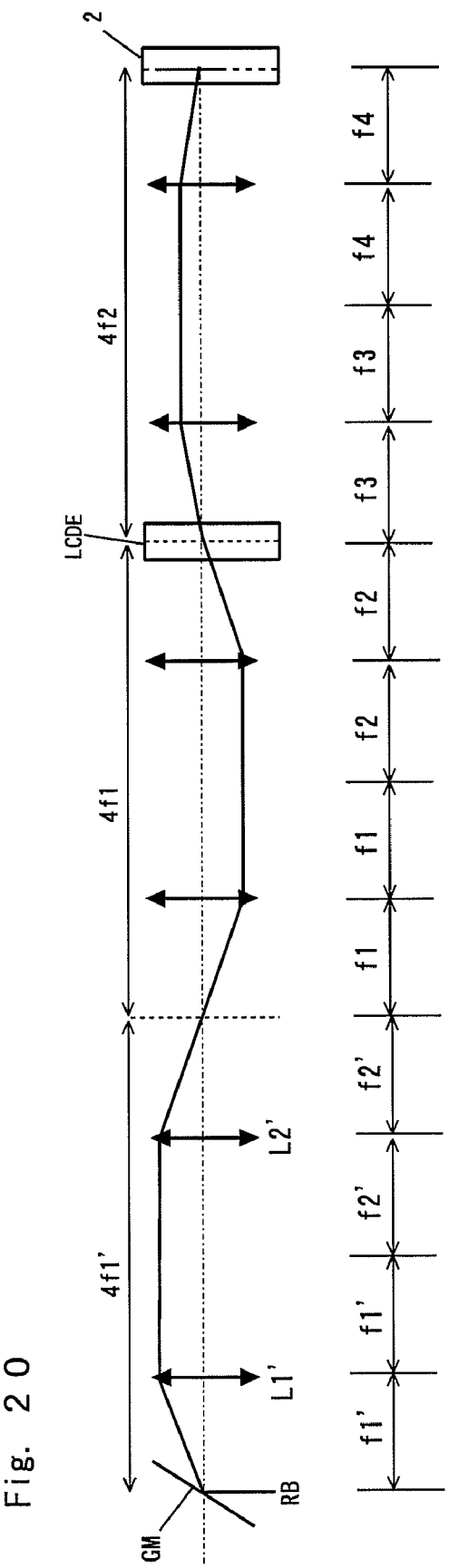
FIG. 20 Diagram showing an optical path diagram of reference light of a light deflecting device of another embodiment according to the invention.
Figure 21:
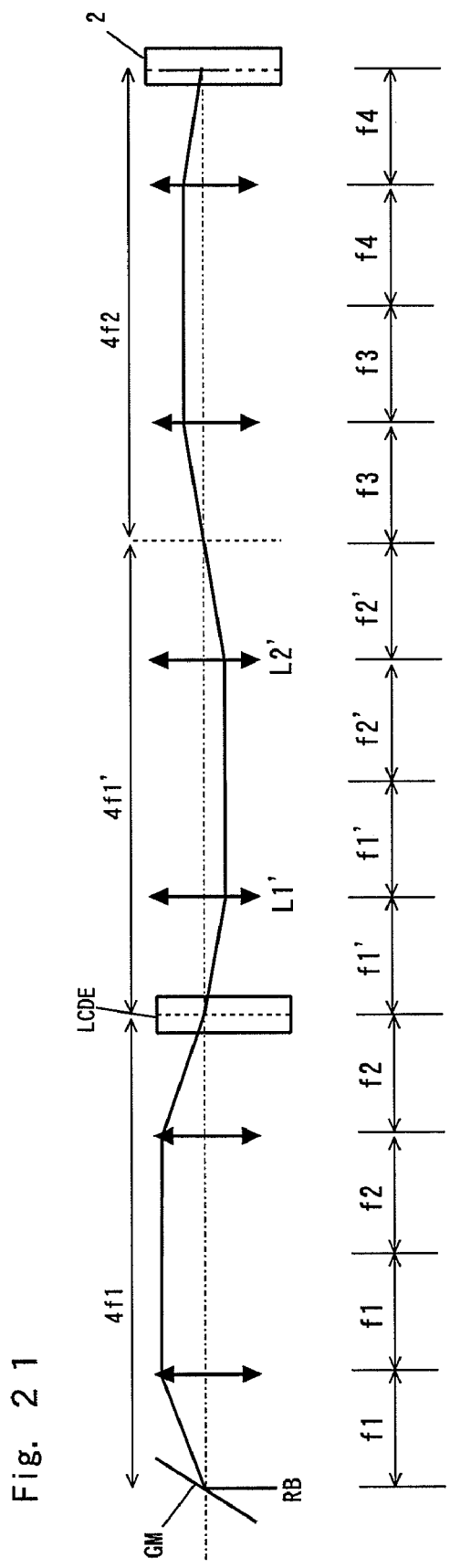
FIG. 21 Diagram showing an optical path diagram of reference light of a light deflecting device of another embodiment according to the invention.

The seventh embodiment is substantially the same as the foregoing first embodiment except that, as shown in FIG. 20, an additional 4f system lens group 4/1' is added to the position of the galvano mirror GM in the first embodiment so as to maintain the image forming relation. In the embodiment, in addition to first and second 4f system lens groups 4/1 and 4/2, the additional 4f system lens group 4/1' is located on the side of the galvano mirror GM. In the eighth embodiment, however, as shown in FIG. 21, the additional 4f system lens group 4/1' may be added between the first and second 4f system lens groups 4/1 and 4/2. That is, if the positions between the 4f systems such as positions between the galvano mirror GM and the liquid crystal deflecting element LCDE or positions between the liquid crystal deflecting element LCDE and the hologram recording medium 2 are coupled by the image forming relation, the light deflecting device can be constructed by a lens system or the like in which two or more 4f systems are coupled.

Figure 22:
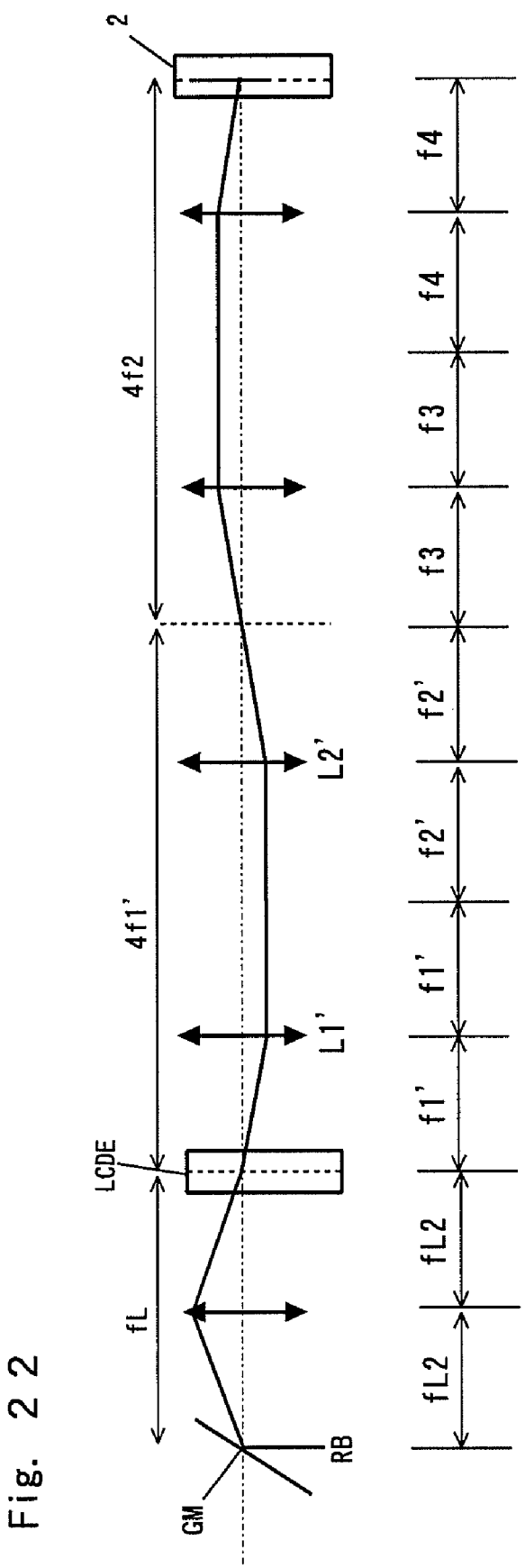
FIG. 22 Diagram showing an optical path diagram of reference light of a light deflecting device of another embodiment according to the invention.

The ninth embodiment is substantially the same as the foregoing eighth embodiment except that, as shown in FIG. 22, the first 4f system lens group 4/1 in the eighth embodiment is replaced by a lens system in which two focal points are sufficient, for example, a Fourier transformation lens system fL. That is, the lens system is not limited so long as the lens groups are further coupled by the image forming relation.

Figure 23:
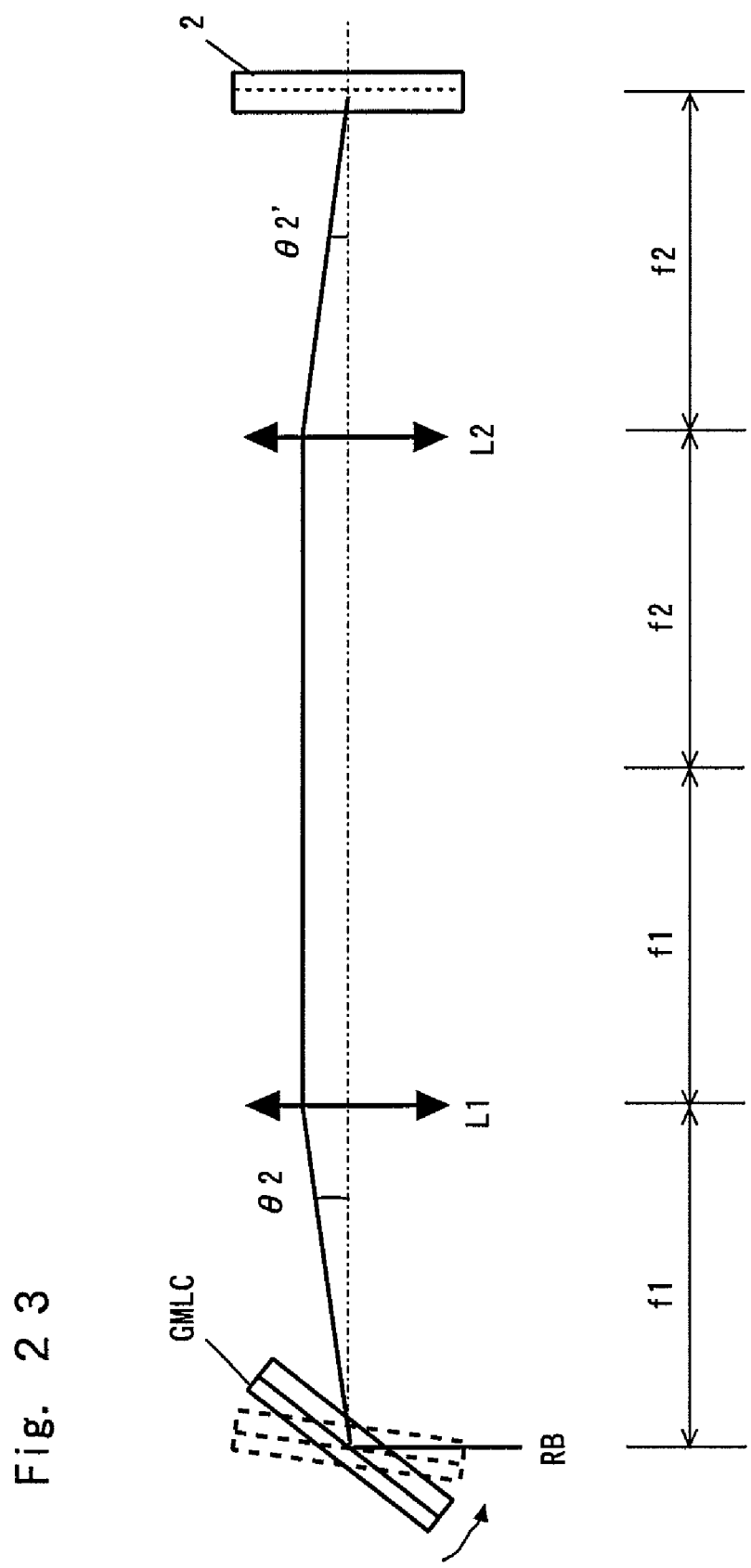
FIG. 23 Diagram showing an optical path diagram of reference light of a light deflecting device of another embodiment according to the invention.

The tenth embodiment is substantially the same as the foregoing first embodiment except that, as shown in FIG. 23, the hologram recording medium 2 is arranged at the position of the liquid crystal deflecting element LCDE in the foregoing first embodiment in place of it, a galvano mirror liquid crystal deflecting element GMLC in which the liquid crystal deflecting element and the galvano mirror are integrated is further arranged at the position of the galvano mirror GM in place of it, and the third and fourth lenses L3 and L4 are omitted. The embodiment has such an advantage that since the reflecting surface as a back surface of the liquid crystal deflecting element LCDE2 includes the rotary axis of the galvano mirror GM and is arranged at a focal point (conjugate point), the light deflecting device can be constructed only by one image forming relation and the light deflecting device structure is simplified.

Figure 24:
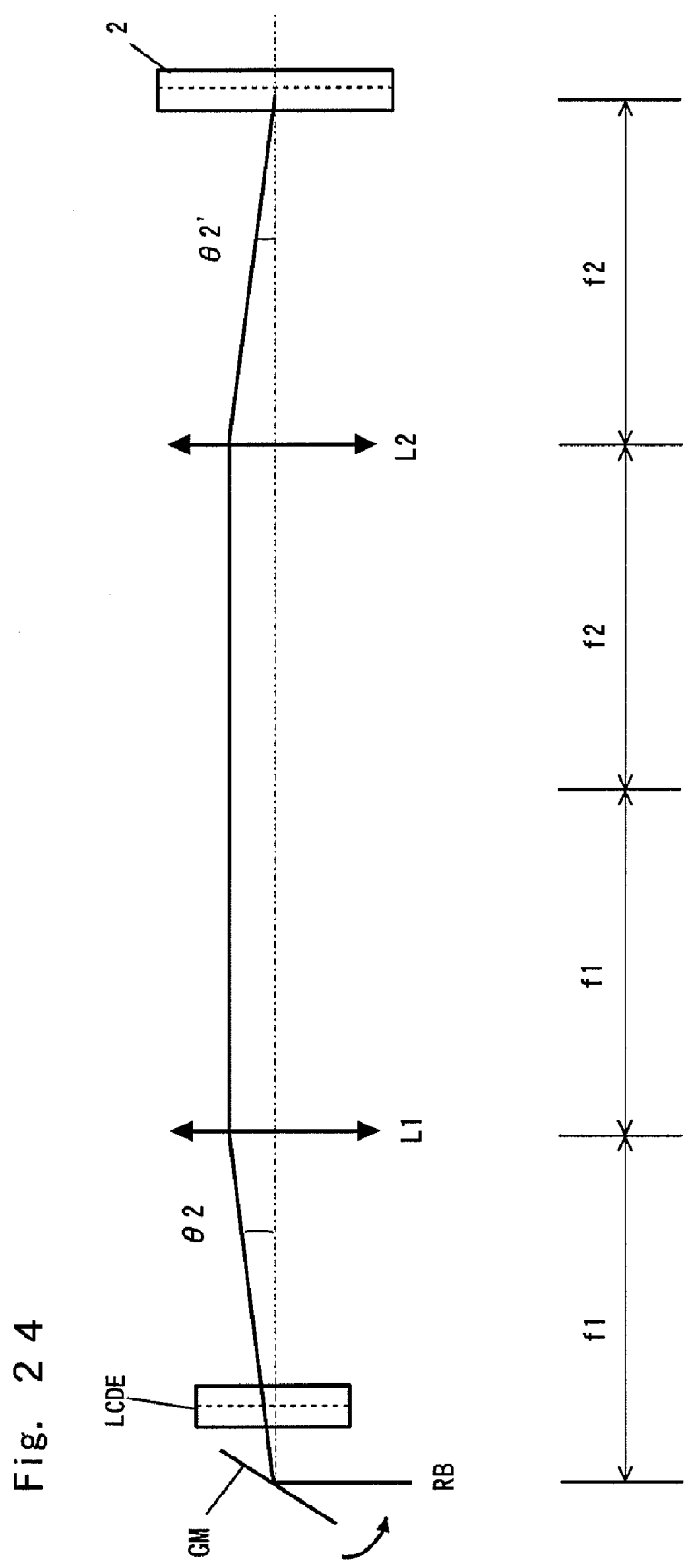
FIG. 24 Diagram showing an optical path diagram of reference light of a light deflecting device of another embodiment according to the invention.

The eleventh embodiment is substantially the same as the foregoing tenth embodiment except that, as shown in FIG. 24, the galvano mirror GM is arranged in place of the galvano mirror liquid crystal deflecting element GMLC in the tenth embodiment and the liquid crystal deflecting element LCDE is arranged near the galvano mirror GM. In the embodiment, although the galvano mirror GM and the liquid crystal deflecting element LCDE are arranged at the positions mutually having the image forming relation, even if the liquid crystal deflecting element LCDE is disposed near the image forming position, the light deflecting device can be constructed only by one image forming relation and an effect of a certain extent can be obtained.

<First Modification>

Although the table which has previously been stored in the memory of the fine motion control circuit FAD is used in order to synchronize the deflection angle of the galvano mirror GM with the deflection angle by the liquid crystal deflecting element LCDE in the embodiment, a servo loop can be constructed by detecting an actual action of the light in modifications.

Figure 25:
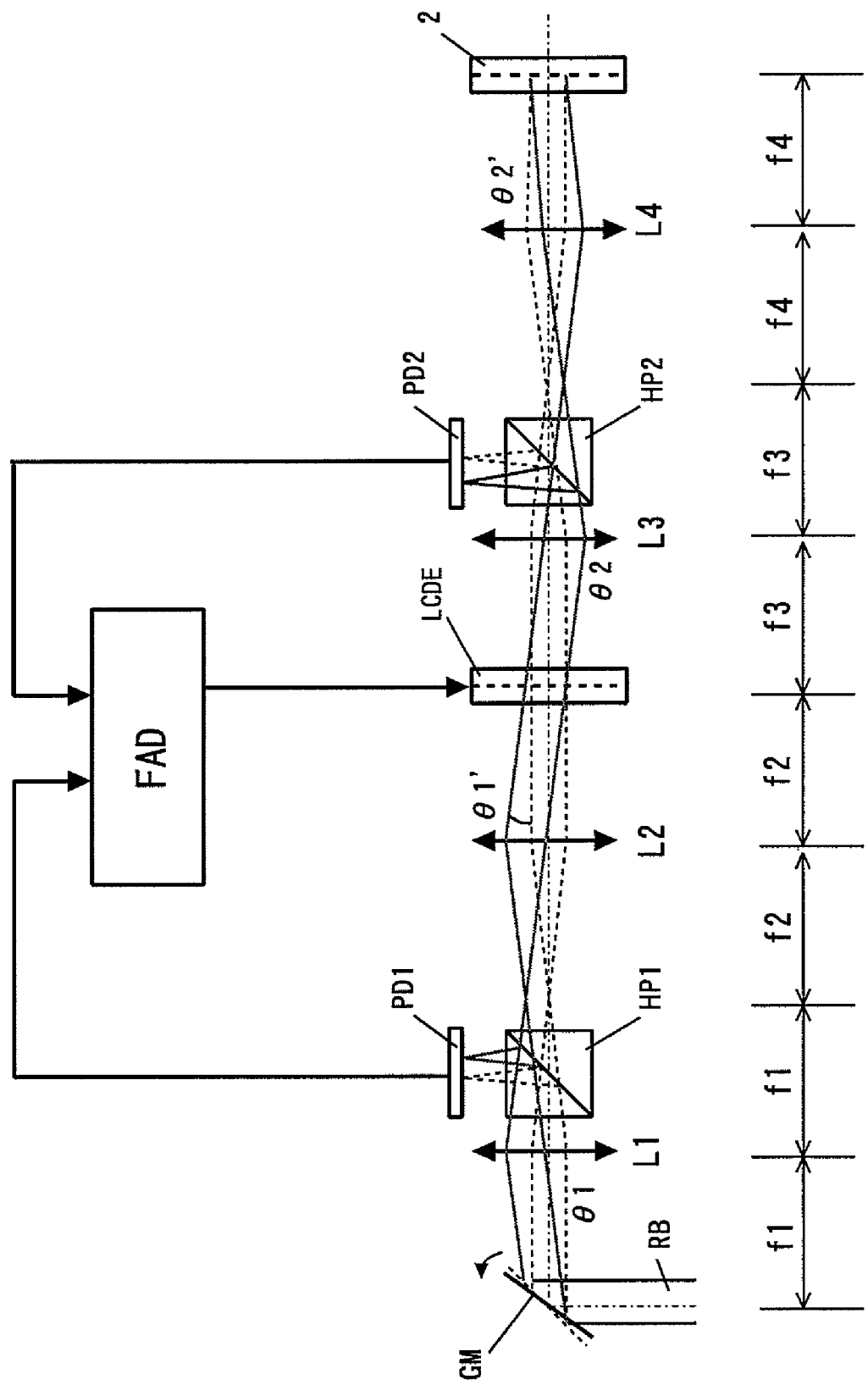
FIG. 25 Diagram showing an optical path diagram of reference light of a light deflecting device of another embodiment according to the invention.

The first modification is shown in FIG. 25 (side elevational view) and it is substantially the same as the foregoing first embodiment except that a half mirror prism HP1 which cooperates with an input side photodetector PD1 is arranged between the first and second lenses L1 and L2 in the first embodiment (FIG. 11), a part of the light on the input side is detected, a half mirror prism HP2 which cooperates with an output side photodetector PD2 is arranged between the third and fourth lenses L3 and L4, a part of the light on the output side is detected, and the applied voltage of the liquid crystal deflecting element LCDE is controlled by the fine motion control circuit FAD on the basis of outputs from the photodetectors.

Figure 26:
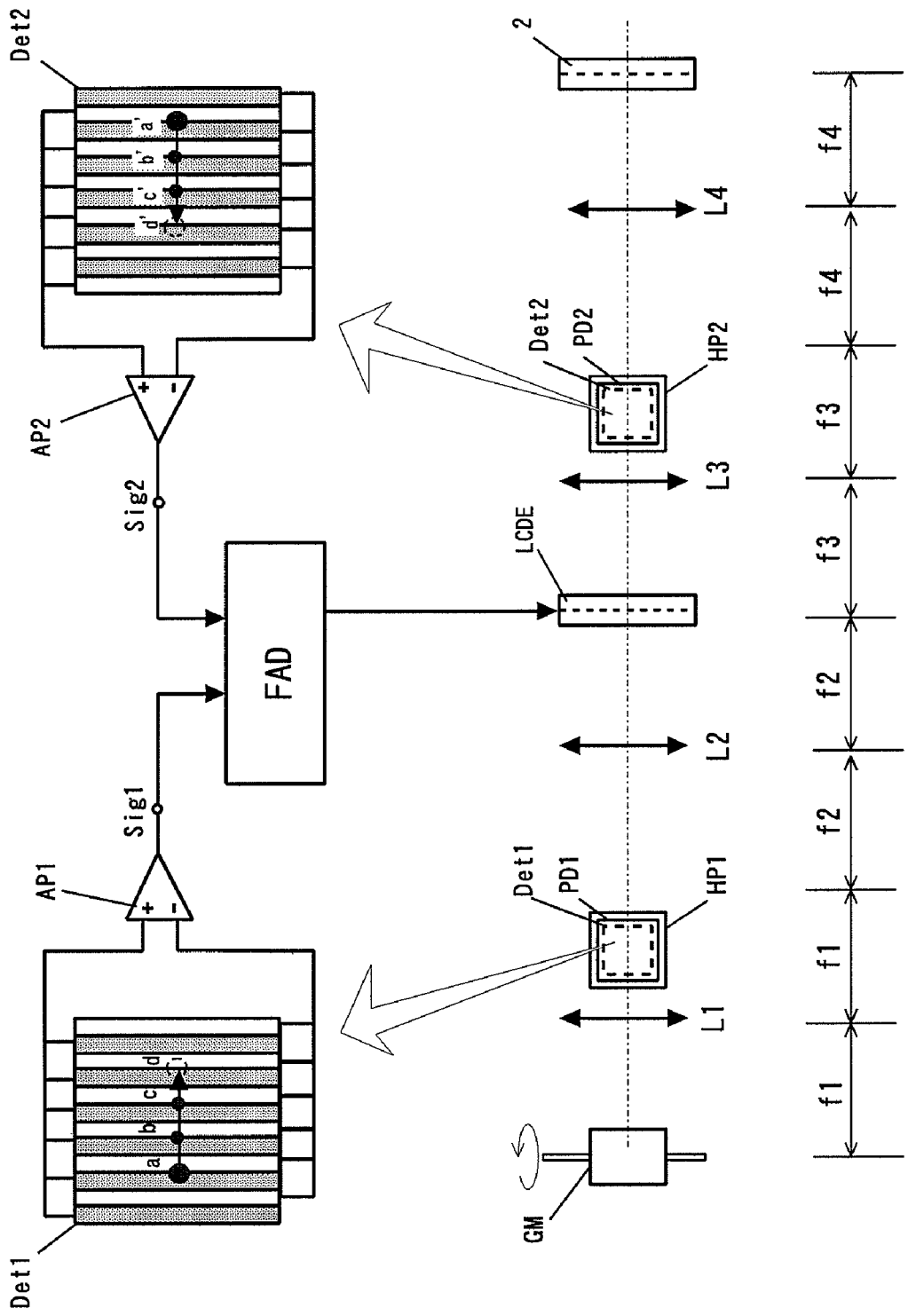
FIG. 26 Diagram showing an optical path diagram of reference light of a light deflecting device of another embodiment according to the invention.

As shown in FIG. 25 and FIG. 26 (top view), the half mirror prism HP1 branches a part of the light between the galvano mirror GM and the liquid crystal deflecting element LCDE perpendicularly from the optical axis and guides to a photosensing element Det1 of the input side photodetector PD1. The photosensing element Det1 has a plurality of rectangular photosensing portions having an equal width which are extended in the direction perpendicular to the optical axis and are juxtaposed in the optical axial direction. The rectangular photosensing portions are alternately connected to inputs having different polarities of an operational amplifier AP1.

A half mirror prism HP2 branches a part of the light between the liquid crystal deflecting element LCDE and the hologram recording medium 2 perpendicularly from the optical axis and guides to a photosensing element Det2 of the output side photodetector PD2. The photosensing element Det2 has a plurality of rectangular photosensing portions having an equal width which are extended in the direction perpendicular to the optical axis and are juxtaposed in the optical axial direction. The rectangular photosensing portions are alternately connected to inputs having different polarities of an operational amplifier AP2.

Figure 27:
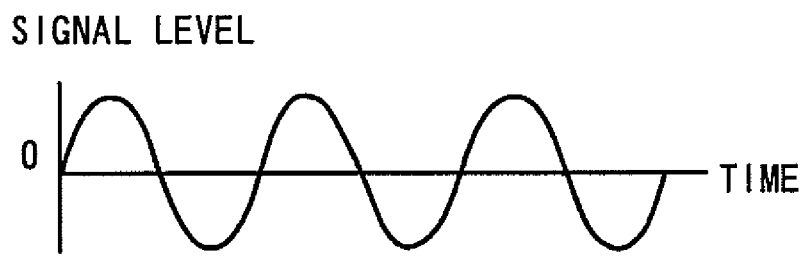
FIG. 27 Graph showing an output waveform of a photodetector of a light deflecting device of another embodiment according to the invention.
Figure 28:
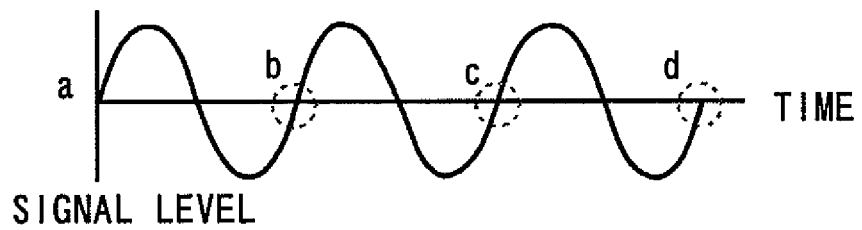
FIG. 28 Graph showing an output waveform of a photodetector of a light deflecting device of another embodiment according to the invention.

When the beam light spot which is received by each of the two photosensing elements Det1 and Det2 on the input and output sides moves (in the optical axial direction), output waveforms Sig1 and Sig2 of the operational amplifiers AP1 and AP2 of both of the photodetectors become sine waves as shown in FIG. 27. That is, the photosensing element of each of the photodetectors is divided in a strip form as illustrated in the diagram and obtains a sine wave output signal by executing a predetermined arithmetic operation.

The operation of the first modification will be described.

First, it is assumed that the liquid crystal deflecting element LCDE does not operate.

A part of the light is guided to the input side photosensing element Det1 by the half mirror prism HP1 arranged between the first and second lenses L1 and L2.

As shown in FIG. 26, it is assumed that the input side photosensing element Det1 is arranged near a convergent point of the light according to the first lens L1, and when the galvano mirror GM is located at an initial position, the light spot on the input side photosensing element Det1 is located at a position a.

When the galvano mirror GM changes its angle at a predetermined rate, the deflection angle $\theta1$ also increases linearly and the position of the light spot on the input side photosensing element Det1 also moves from b to c and d. Since f1=f2, the deflection angle $\theta1$=the deflection angle $\theta1'$.

At this time, a waveform of the light input side signal Sig1 of the input side photodetector PD1 becomes a sine wave as shown in FIG. 8 and points a to d on the waveform correspond to the positions a to d of the light spot on the input side photosensing element Det1, respectively.

After the third lens L3, a part of the light is also guided to the output side photosensing element Det2 by the half mirror prism HP2. In this case, the output side photosensing element Det2 has substantially the same shape as that of the input side photosensing element Det1 and obtains the similar light output side signal Sig2 by a similar arithmetic operation.

Since the liquid crystal deflecting element LCDE does not operate, the deflection angle $\theta2$=the deflection angle $\theta1'$. When the light spot on the input side photosensing element Det1 moves to a, b, c, and d by the motion of the galvano mirror GM, the light spot on the output side photosensing element Det2 also moves to a', b', c', and d'.

Subsequently, the liquid crystal deflecting element LCDE is made operative.

Since the liquid crystal deflecting element LCDE is made operative, an angle obtained by adding the deflection angle $\theta L$ according to the applied voltage to the incident angle of the light to the liquid crystal deflecting element LCDE becomes an outgoing angle, that is, the deflection angle $\theta2$.

When the light spot on the output side photosensing element Det2 is located at a position a', a value of the light output side signal Sig2 is equal to 0.

The applied voltage of the liquid crystal deflecting element LCDE is controlled so that the value of the light output side signal Sig2 is maintained to 0.

While the light spot on the input side photosensing element Det1 moves from a toward b, the light spot on the output side photosensing element Det2 is fixed to the position a' and the value of the deflection angle $\theta2$ is also maintained to an initial value (deflection angle $\theta20$).

Simultaneously with that the sign of the signal of the light input side signal Sig1 changes from negative to positive, that is, when the position of the light spot reaches the position b, the applied voltage of the liquid crystal deflecting element LCDE is reset to 0. At this time, the liquid crystal deflecting element LCDE enters the same state as that where it does not operate, and the deflection angle $\theta1$=the deflection angle $\theta2$.

At this time, the position of the light spot on the output side photosensing element Det2 moves to b'. When the applied voltage of the liquid crystal deflecting element LCDE is reset, the voltage is controlled at the next moment so that the light output side signal Sig2 is again maintained to 0.

Since the value of the light output side signal Sig2 is equal to 0 when the light spot on the output side photosensing element Det2 is located at the position b', the voltage is controlled so that the light spot on the output side photosensing element Det2 is maintained at the position b'.

The value of the deflection angle θ2 is also maintained at another angle of the deflection angle θ20+Δθ.

By subsequently repeating similar processes, the angle of the light which is emitted from the liquid crystal deflecting element LCDE and the angle of the light which enters the hologram recording medium 2 change in a step-like manner as shown by characteristics in FIG. 29. There is an important meaning with respect to a point that, in this manner, the two photodetectors on the input and output sides having the strip-shaped photosensing elements are used, the angle of the light which is emitted from the liquid crystal deflecting element LCDE is held constant by using the output signal from the output side photosensing element Det2 of one of the photodetectors, and the applied voltage of the liquid crystal deflecting element LCDE is reset by using the output signal from the input side photosensing element Det1 of the other photodetector.

Subsequently, operation processes of the reference light in the case where the galvano mirror GM by the reference light mirror driving circuit MD and the liquid crystal deflecting element LCDE by the fine motion control circuit FAD in the first modification are combined will be described in detail by using flowcharts. The operation processes are executed by a control device for controlling the reference light mirror driving circuit MD and the fine motion control circuit FAD.

Figure 30:
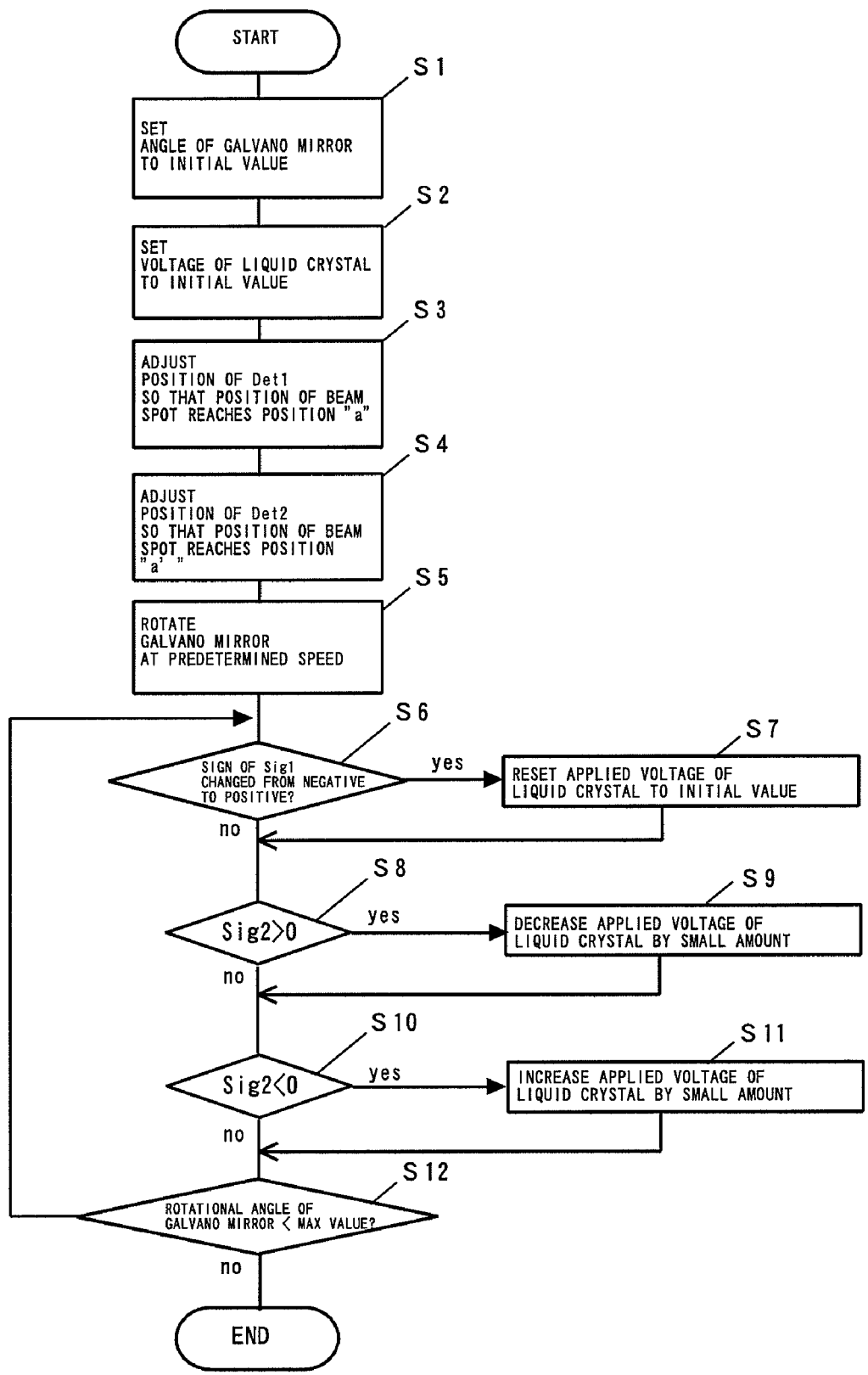
FIG. 30 Flowchart showing operation processes of the reference light in the case where the galvano mirror by a reference light mirror driving circuit and the liquid crystal deflecting element by a fine motion control circuit in the light deflecting device are combined in the embodiment according to the invention.

As shown in FIG. 30, when the operation processes are started, the angle of the galvano mirror GM is set to an initial value (step S1).

Subsequently, the voltage of the liquid crystal deflecting element LCDE is set to an initial value (step S2). It is assumed that the deflecting function of the liquid crystal deflecting element LCDE does not operate at the time of the initial voltage.

Subsequently, the position of the light spot reaches the position a by adjusting the position of the input side photosensing element Det1 (step S3). Although the position of the light spot a may be set to an arbitrary position, in the case of the example, when it is located on a boundary of the input side photosensing element Det1, the value of the light input side signal Sig1 is equal to 0.

Subsequently, the position of the light spot reaches the position a' by adjusting the position of the output side photosensing element Det2 (step S4). Although the position of the light spot a' may be set to an arbitrary position, in the case of the example, when it is located on a boundary of the photodetector, the value of the light output side signal Sig2 is equal to 0.

Subsequently, the galvano mirror GM is rotated at a predetermined speed (step S5). The light input side signal Sig1 starts to change in a sine wave manner and the light output side signal Sig2 also starts to change similarly here.

Subsequently, whether or not the sign of the light input side signal Sig1 has been changed from negative to positive is discriminated (step S6).

When it changes from negative to positive (yes), the applied voltage of the liquid crystal deflecting element LCDE is reset to the initial value (step S7) and the processing routine advances to the next step (step S8). Since the deflecting function by the liquid crystal deflecting element LCDE does not momentarily operate here, the light spot existing at the position a' moves to the position b'.

If the sign does not change from negative to positive in step S6 (no), the processing routine advances to the next step and whether or not the light output side signal Sig2 exceeds 0 is discriminated (step S8).

If the light output side signal Sig2 exceeds 0 in step S8 (yes), the applied voltage of the liquid crystal deflecting element LCDE is reduced by a small amount (step S9) and the processing routine advances to the next step (step S10).

If the light output side signal Sig2 does not exceed 0 in step S8 (no), the processing routine advances to the next step and whether or not the light output side signal Sig2 is less than 0 is discriminated (step S10).

If the light output side signal Sig2 is less than 0 in step S10 (yes), the applied voltage of the liquid crystal deflecting element LCDE is increased by a small amount (step S11) and the processing routine advances to the next step (step S12).

If the light output side signal Sig2 is not less than 0 in step S10 (no), the processing routine advances to the next step and whether or not the rotational angle of the galvano mirror GM is less than the maximum value is discriminated (step S12).

If the rotational angle of the galvano mirror GM is less than the maximum value in step S12 (yes), the processing routine is returned to step S6 and steps are repeated.

If the rotational angle of the galvano mirror GM is not less than the maximum value in step S12 (no), the processing routine is finished.

Figure 29:
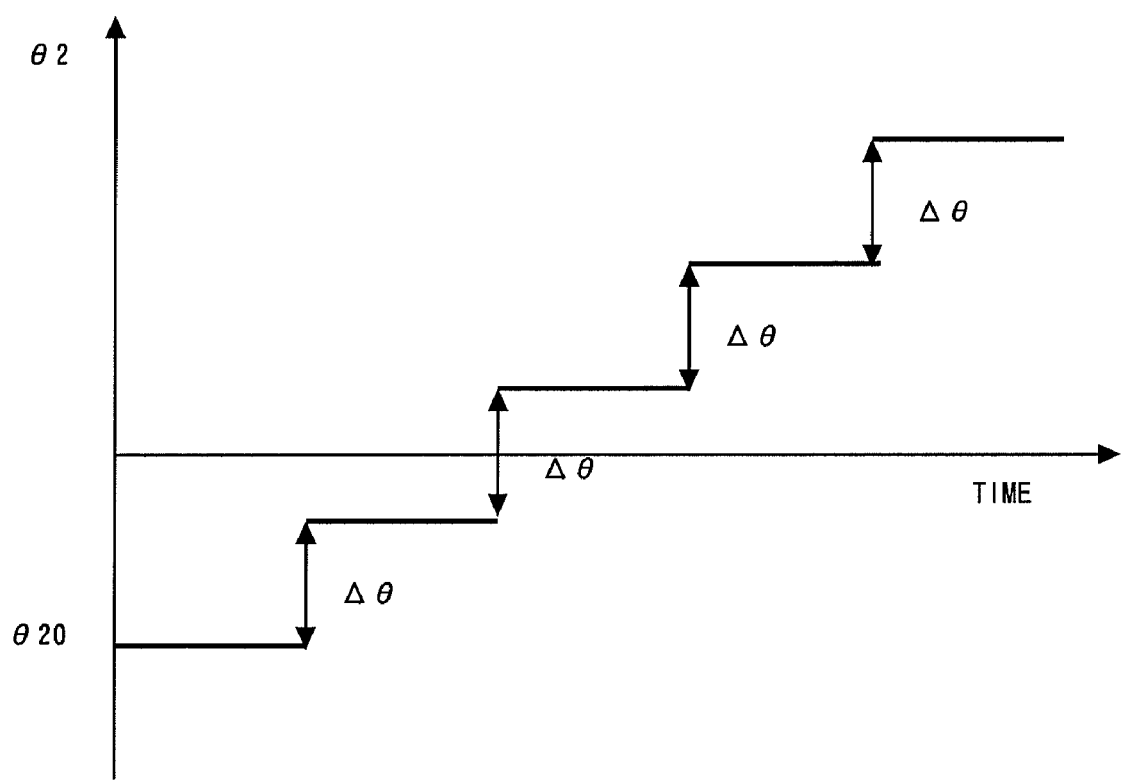
FIG. 29 Graph of characteristics showing a change in deflection angle regarding the time of the reference light which is irradiated to the hologram recording medium in the light deflecting device of the embodiment according to the invention.

By executing the above operation processes, the angle of the light which is emitted from the liquid crystal deflecting element LCDE and the angle of the light which enters the hologram recording medium 2 can be changed in a step-like manner as shown by the characteristics in FIG. 29.

<Second Modification>

Figure 31:
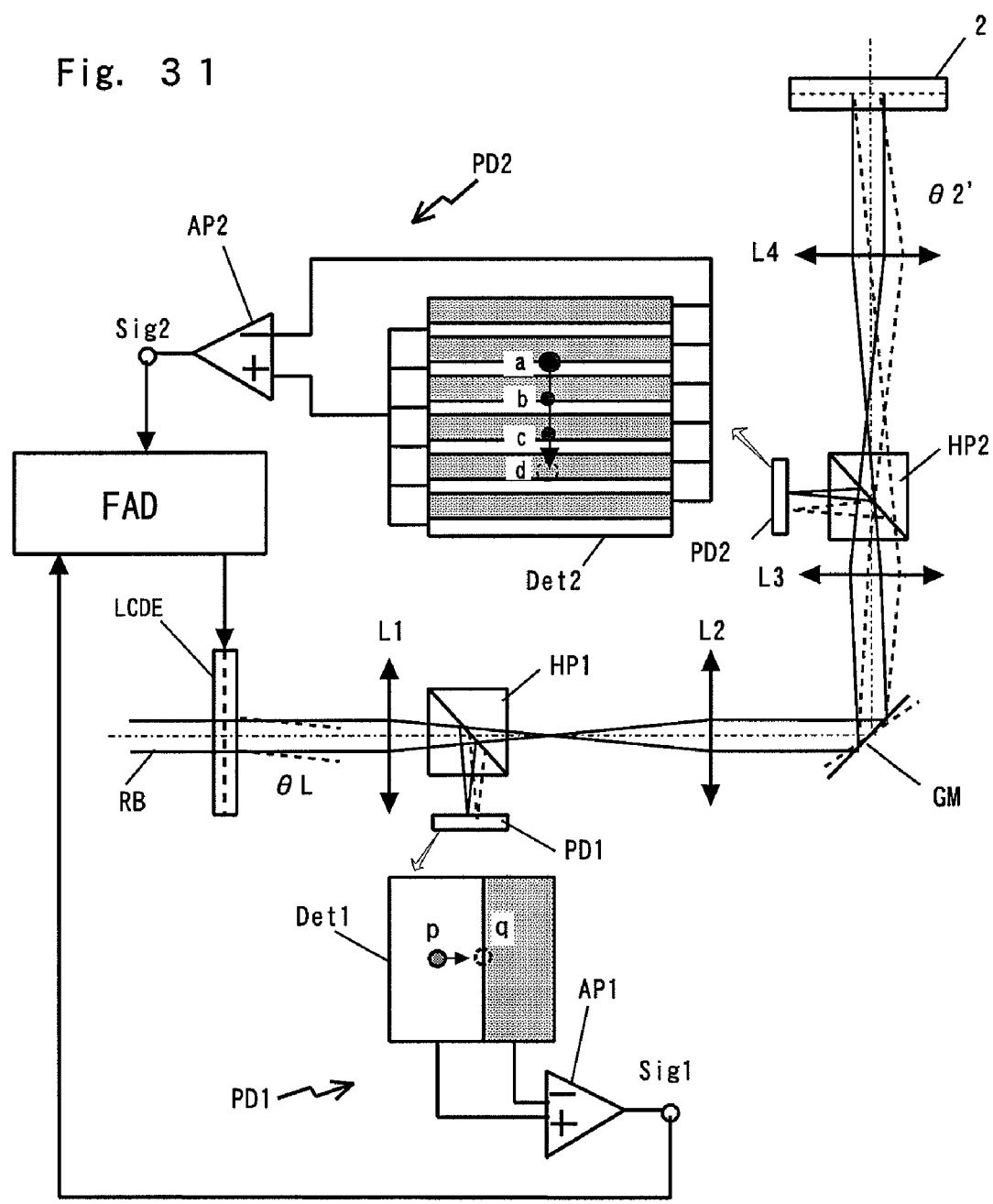
FIG. 31 Diagram showing an optical path diagram of reference light of a light deflecting device of another embodiment according to the invention.

The second modification is shown in FIG. 31 (side elevational view) and it is a constructional example in the case where the reference light enters the liquid crystal deflecting element LCDE first and it is substantially the same as the foregoing fourth embodiment except that the half mirror prism HP1 which cooperates with an input side photodetector PD1 is arranged between the first and second lenses L1 and L2 in the fourth embodiment (FIG. 17), a part of the light on the input side is detected, the half mirror prism HP2 which cooperates with an output side photodetector PD2 is arranged between the third and fourth lenses L3 and L4, a part of the light on the output side is detected, and the applied voltage of the liquid crystal deflecting element LCDE is controlled by the fine motion control circuit FAD on the basis of outputs from the photodetectors.

As shown in FIG. 31, the half mirror prism HP1 branches a part of the light between the galvano mirror GM and the liquid crystal deflecting element LCDE perpendicularly from the optical axis and guides to the photosensing element Det1 of the input side photodetector PD1. The photosensing element Det1 has two rectangular photosensing portions which are extended in the direction perpendicular to the optical axis and are juxtaposed in the optical axial direction. Unlike the first modification, however, the photosensing element is not the strip-shaped photosensing element but a 2-split photosensing element. The two rectangular photosensing portions are connected to the inputs having the different polarities of the operational amplifier AP1. The input side photosensing element Det1 which has been divided into two photosensing elements obtains the light input side signal Sig1 of the operational amplifier AP1 from a difference between outputs of the photosensing elements.

The half mirror prism HP2 branches a part of the light between the liquid crystal deflecting element LCDE and hologram recording medium 2 perpendicularly from the optical axis and guides to the photosensing element Det2 of the output side photodetector PD2. In a manner similar to the first modification, the photosensing element Det2 has a plurality of rectangular photosensing portions having an equal width which are extended in the direction perpendicular to the optical axis and are juxtaposed in the optical axial direction. The rectangular photosensing portions are alternately connected to the inputs having the different polarities of the operational amplifier AP2.

The operation of the second modification will be described.

First, it is assumed that the liquid crystal deflecting element LCDE does not operate.

A part of the light is guided to the input side photosensing element Det1 by the half mirror prism HP1 arranged between the first and second lenses L1 and L2.

It is assumed that the input side photosensing element Det1 is arranged near the convergent point of the light according to the first lens L1 and the light spot on the input side photosensing element Det1 is located at a position p (when no voltage is applied).

A part of the light is also guided to the output side photosensing element Det2 by the half mirror prism HP2 arranged between the third and fourth lenses L3 and L4.

The output side photosensing element Det2 is a part of the output side photodetector PD2 and obtains the light output side signal Sig2 in a manner similar to the first modification.

It is assumed that when the galvano mirror GM is located at the initial position, the light spot on the output side photosensing element Det2 is located at the position a.

When the galvano mirror GM changes its angle at a predetermined rate, the deflection angle θ2 also increases linearly and the position of the light spot on the output side photosensing element Det2 also moves from b to c and d.

At this time, a waveform of the light output side signal Sig2 becomes a sine wave similar to that in the first modification.

Subsequently, the liquid crystal deflecting element LCDE is made operative.

Assuming that a deflection angle by the liquid crystal deflecting element LCDE is equal to θL and a rotational angle of the galvano mirror GM is equal to φ, the deflection angle θ2 of the light after it was reflected by the galvano mirror GM is equal to the deflection angle $\theta2=2*\phi+\theta L$. A value of the deflection angle θ2 can be changed by setting a proper value into the deflection angle θL by the fine motion control circuit FAD.

An output of the output side photosensing element Det2 is equal to 0 in a state where the light spot is located at the initial position a. The applied voltage to the liquid crystal deflecting element LCDE is controlled by the fine motion control circuit FAD so that the value of the light output side signal Sig2 is maintained to 0, thereby enabling the value of the deflection angle θ2 to be maintained to an initial value (deflection angle θ20).

Even in a state where the deflection angle θ2 is fixed to the initial value, the galvano mirror GM continues to rotate and the deflection angle θL also increases.

The light spot on the input side photosensing element Det1 moves from the initial position p toward q. At the position q, the beam exists just at the center of a dividing line and in this state, the value of the light input side signal Sig1 of the input side photodetector PD1 is equal to 0.

When the value of the light input side signal Sig1 is equal to 0, the applied voltage to the liquid crystal deflecting element LCDE is reset to 0 by the fine motion control circuit FAD.

When it is reset, the liquid crystal deflecting element LCDE enters substantially the same state as that where it does not operate, and the deflection angle θL=0.

At this time, the position of the light spot on the output side photosensing element Det2 moves to b and the light spot on the input side photosensing element Det1 is returned to p.

When the applied voltage to the liquid crystal deflecting element LCDE is reset, the voltage is controlled again so that the light output side signal Sig2 is maintained to 0.

As for the position of the light spot on the output side photosensing element Det2 after the liquid crystal deflecting element LCDE was reset, although it is located in a range from the position a' to the position b' in the first modification, it has been jumped from the position a to the position b in the second modification. Simultaneously with the jump, the value of the light output side signal Sig2 is set to 0. As mentioned above, it is unnecessary to accurately jump onto the boundary line but it is sufficient to jump to an arbitrary position. Since control is made so as to set the light output side signal Sig2 to 0 immediately after the jump, the light spot is pulled in onto the nearest boundary line.

When the light spot on the output side photosensing element Det2 is located at the position b, since the value of the light output side signal Sig2 is equal to 0, the voltage is controlled by the fine motion control circuit FAD so that the light spot on the output side photosensing element Det2 is maintained at the position b.

The value of the deflection angle θ2 is also maintained at another angle of the deflection angle θ20+Δθ.

By subsequently repeating similar processes, the angle of the light which is emitted from the liquid crystal deflecting element LCDE and the angle of the light which enters the hologram recording medium 2 change in a step-like manner.

Subsequently, operation processes of the reference light in the case where the galvano mirror GM by the reference light mirror driving circuit MD and the liquid crystal deflecting element LCDE by the fine motion control circuit FAD in the second modification are combined will be described in detail by using flowcharts. The operation processes are executed by the control device for controlling the reference light mirror driving circuit MD and the fine motion control circuit FAD.

Figure 32:
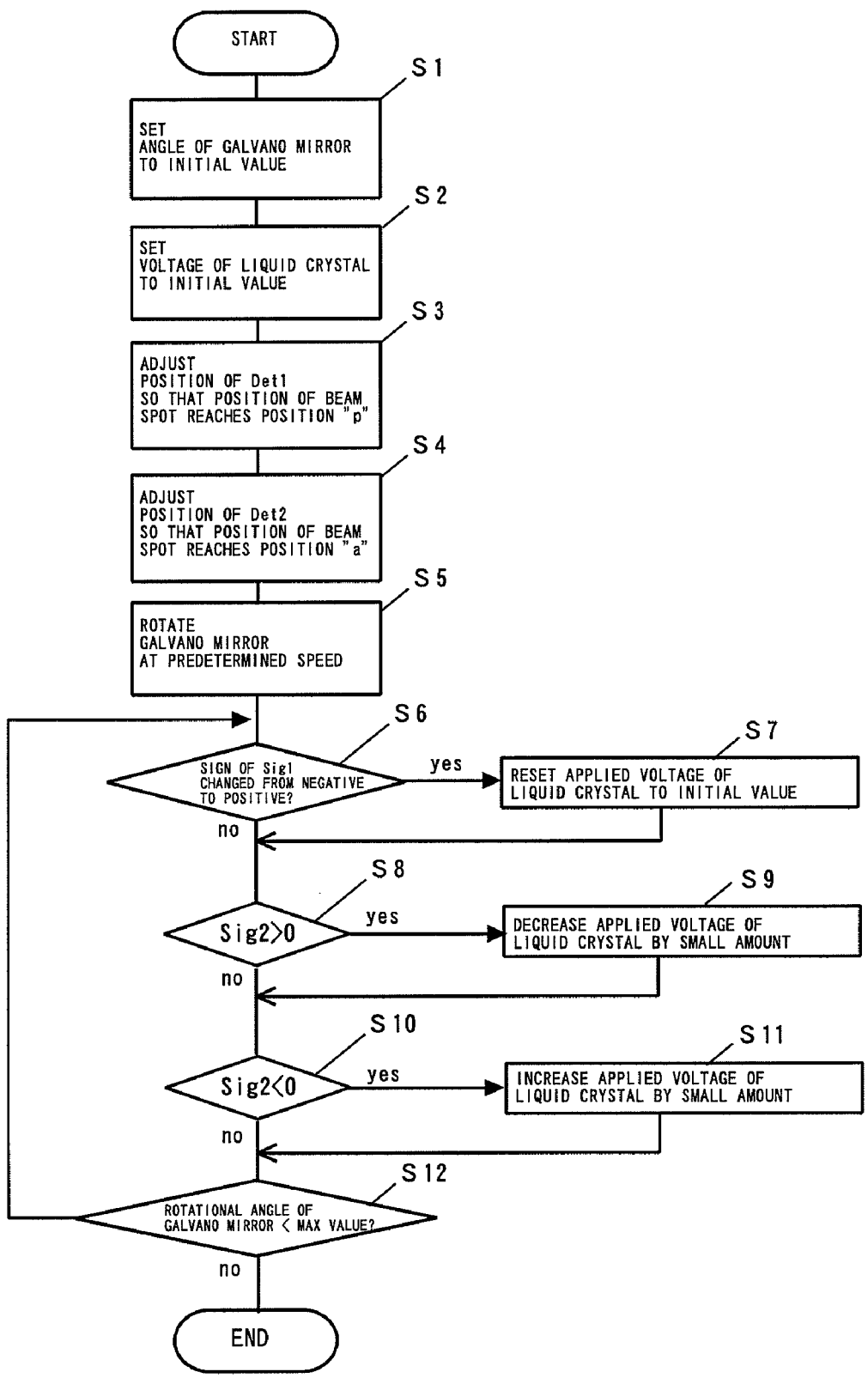
FIG. 32 Flowchart showing operation processes of the reference light in the case where the galvano mirror by the reference light mirror driving circuit and the liquid crystal deflecting element by the fine motion control circuit in the light deflecting device are combined in the embodiment according to the invention.

As shown in FIG. 32, when the operation processes are started, first, the angle of the galvano mirror GM is set to the initial value (step S1).

Subsequently, the voltage of the liquid crystal deflecting element LCDE is set to the initial value (step S2). It is assumed that the deflecting function of the liquid crystal deflecting element LCDE does not operate at the time of the initial voltage.

Subsequently, the position of the light spot reaches the position p by adjusting the position of the input side photosensing element Det1 (step S3). Although the position p may be set to an arbitrary position so long as it is located on the right side (light input side) of the 2-split input side photosensing element Det1, in the case of the example, since a width of step is decided by a length between p and q on the input side photosensing element Det1, it is sufficient to adjust it to a proper position as necessary.

Subsequently, the position of the light spot reaches the position a by adjusting the position of the output side photosensing element Det2 (step S4). Although the position of the light spot a may be set to an arbitrary position, in the case of the example, when it is located on the boundary of the photodetector, the value of the light output side signal Sig2 is equal to 0.

Subsequently, the galvano mirror GM is rotated at the predetermined speed (step S5). The light input side signal Sig1 starts to change in a sine wave manner.

Subsequently, whether or not the sign of the light input side signal Sig1 has been changed from negative to positive is discriminated (step S6). That is, whether or not the light spot on the input side photosensing element Det1 has reached the position q is discriminated.

When it changes from negative to positive (yes), the applied voltage of the liquid crystal deflecting element LCDE is reset to the initial value (step S7) and the processing routine advances to the next step (step S8). Since the deflecting function by the liquid crystal deflecting element LCDE does not momentarily operate here, the light spot existing at the position a moves to the position b. The light spot on the input side photosensing element Det1 is returned to the initial position p.

If the sign does not change from negative to positive in step S6 (no), the processing routine advances to the next step and whether or not the light output side signal Sig2 exceeds 0 is discriminated (step S8).

If the light output side signal Sig2 exceeds 0 in step S8 (yes), the applied voltage of the liquid crystal deflecting element LCDE is reduced by a small amount (step S9) and the processing routine advances to the next step (step S10).

If the light output side signal Sig2 does not exceed 0 in step S8 (no), the processing routine advances to the next step and whether or not the light output side signal Sig2 is less than 0 is discriminated (step S10).

If the light output side signal Sig2 is less than 0 in step S10 (yes), the applied voltage of the liquid crystal deflecting element LCDE is increased by a small amount (step S11) and the processing routine advances to the next step (step S12).

If the light output side signal Sig2 is not less than 0 in step S10 (no), the processing routine advances to the next step and whether or not the rotational angle of the galvano mirror GM is less than the maximum value is discriminated (step S12).

If the rotational angle of the galvano mirror GM is less than the maximum value in step S12 (yes), the processing routine is returned to step S6 and the steps are repeated.

If the rotational angle of the galvano mirror GM is not less than the maximum value in step S12 (no), the processing routine is finished.

By executing the above operation processes, the angle of the light which is emitted from the liquid crystal deflecting element LCDE and the angle of the light which enters the hologram recording medium 2 can be changed in a step-like manner as shown in FIG. 29.

<Other Modifications>

With respect to the positions of the input side photosensing element Det1 and the output side photosensing element Det2, it is unnecessary that the position of the prism for branching the light to the photosensing element of the photodetector is located between the two lenses of the 4f system. It is sufficient to add lenses as necessary so as to converge the light onto the photosensing element of the photodetector.

It is unnecessary to dispose the photosensing element of the photodetector to a perfect converging position but it may be set to a position near the converging position where the light spot has a size of a certain extent.

Figure 33:
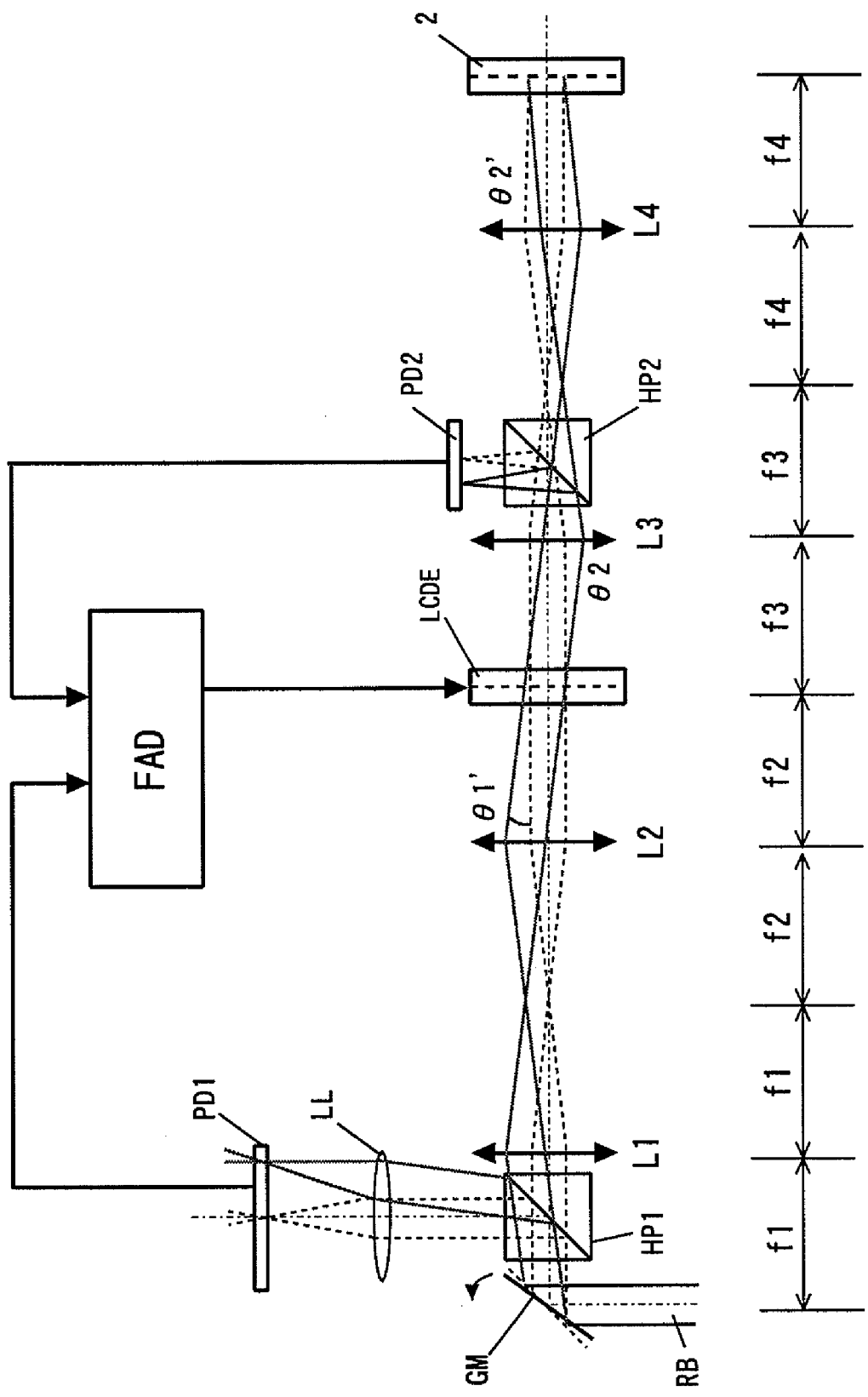
FIG. 33 Diagram showing an optical path diagram of reference light of a light deflecting device of another embodiment according to the invention.

For example, there is also considered a construction similar to that of the first modification except that, as shown in FIG. 33, the half mirror prism HP1 arranged between the first and second lenses L1 and L2 in the first modification is changed so as to be arranged between the galvano mirror GM and the first lens L1 and the light is guided from the half mirror prism HP1 to the input side photosensing element Det1 through a magnifying lens LL.

<Modification of Photodetector>

Figure 34:
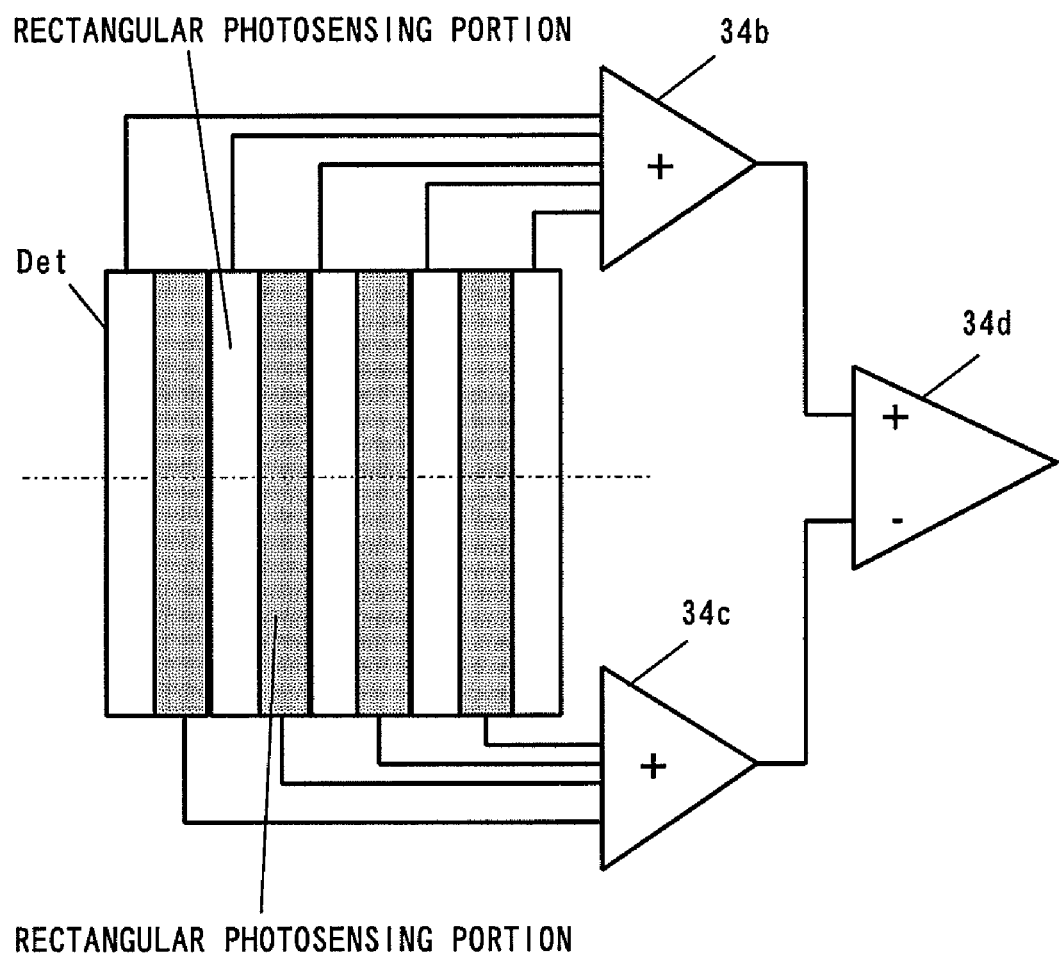
FIG. 34 Front view showing a photosensing element of a photodetector of a light deflecting device of another embodiment according to the invention.

Although the photosensing elements on the input and output sides in the photodetector are the strip-shaped photosensing elements, fundamentally, as shown in FIG. 34, it is also possible to construct in such a manner that a photosensing element Det has a plurality of rectangular photosensing portions having an equal width which are extended in the direction perpendicular to the optical axial direction (moving direction of the beam), and a difference between the sum of outputs of a photodetector (34b) of the odd-number designated photosensing elements and the sum of outputs of a photodetector (34c) of the even-number designated photosensing elements is obtained by a photodetector (34d).

Figure 35:
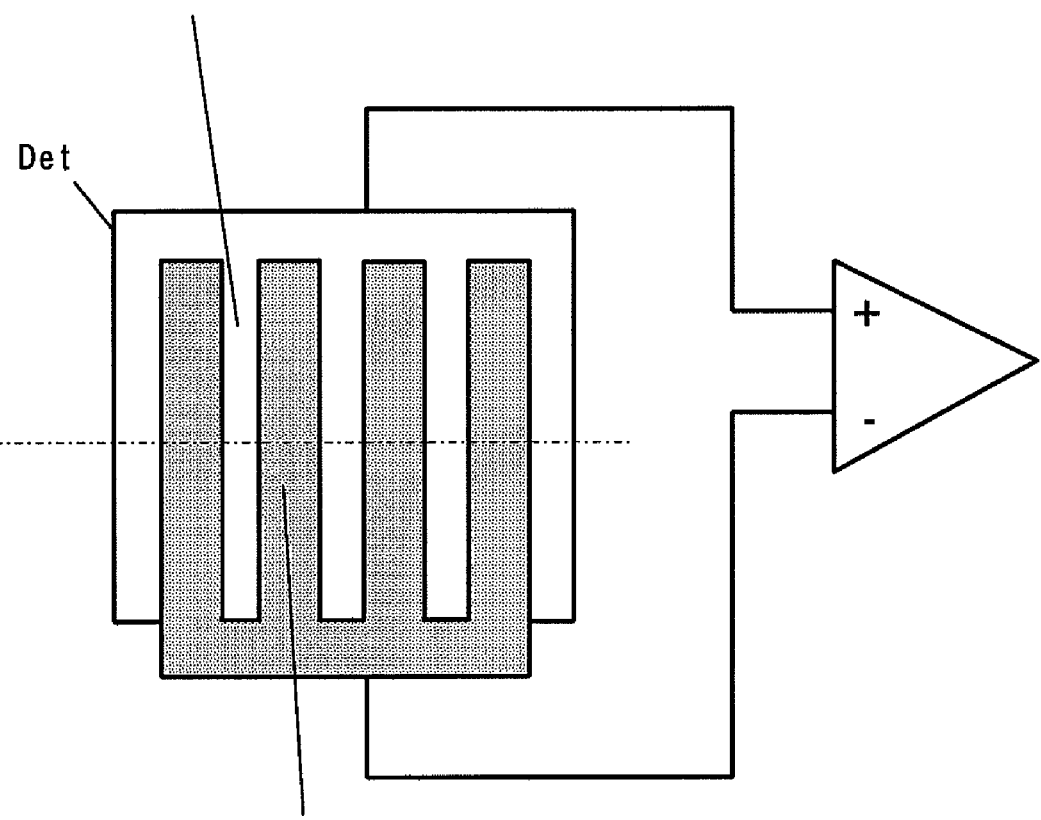
FIG. 35 Front view showing a photosensing element of a photodetector of a light deflecting device of another embodiment according to the invention.

The same effect will be obtained even if the rectangular photosensing portions are formed in a comb-like shape, that is, the photodetector of the odd-number designated photosensing elements and the photodetector of the even-number designated photosensing elements when they are counted from the input side of the optical axis are constructed by one photodetector as illustrated in FIG. 35.

Figure 36:
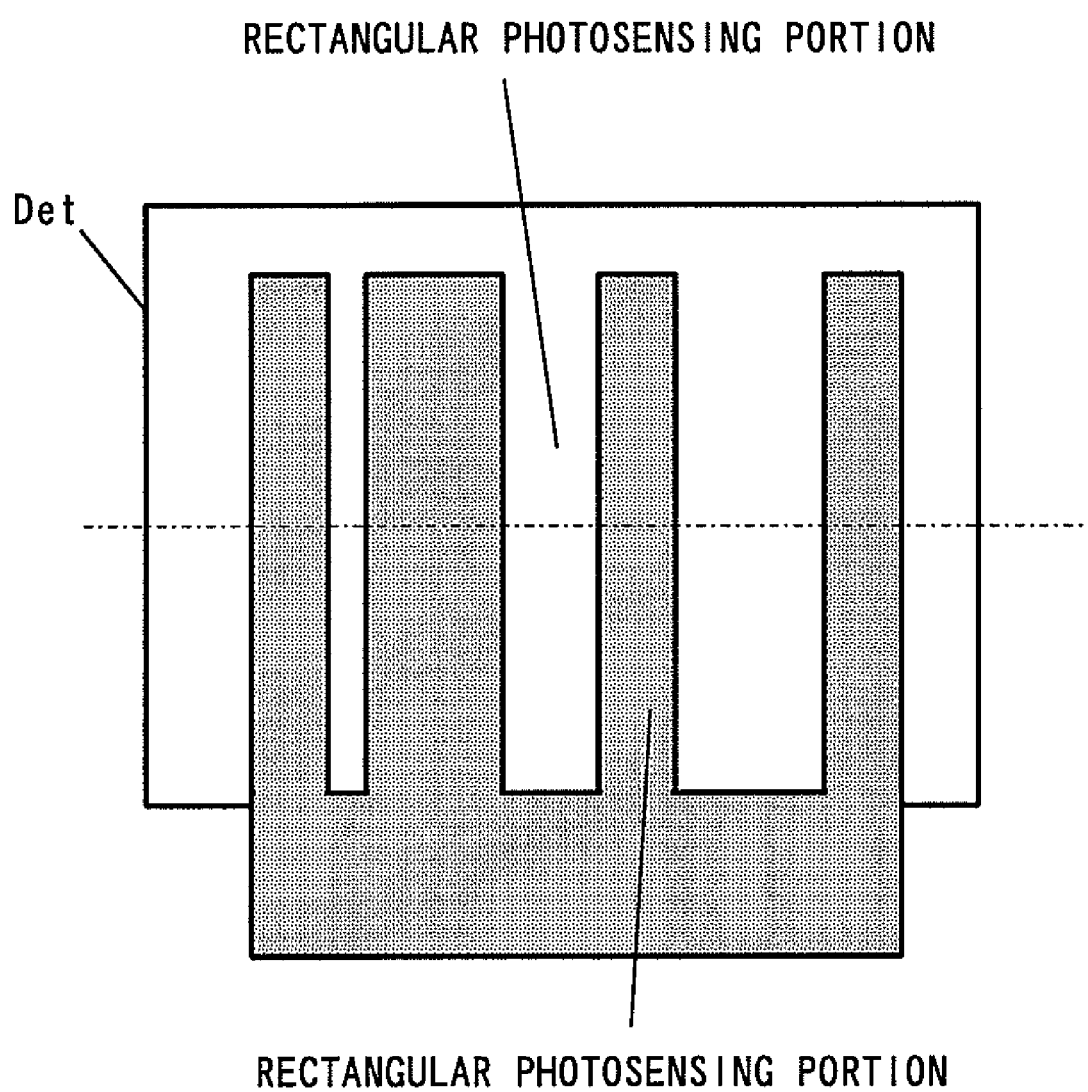
FIG. 36 Front view showing a photosensing element of a photodetector of a light deflecting device of another embodiment according to the invention.
Figure 37:
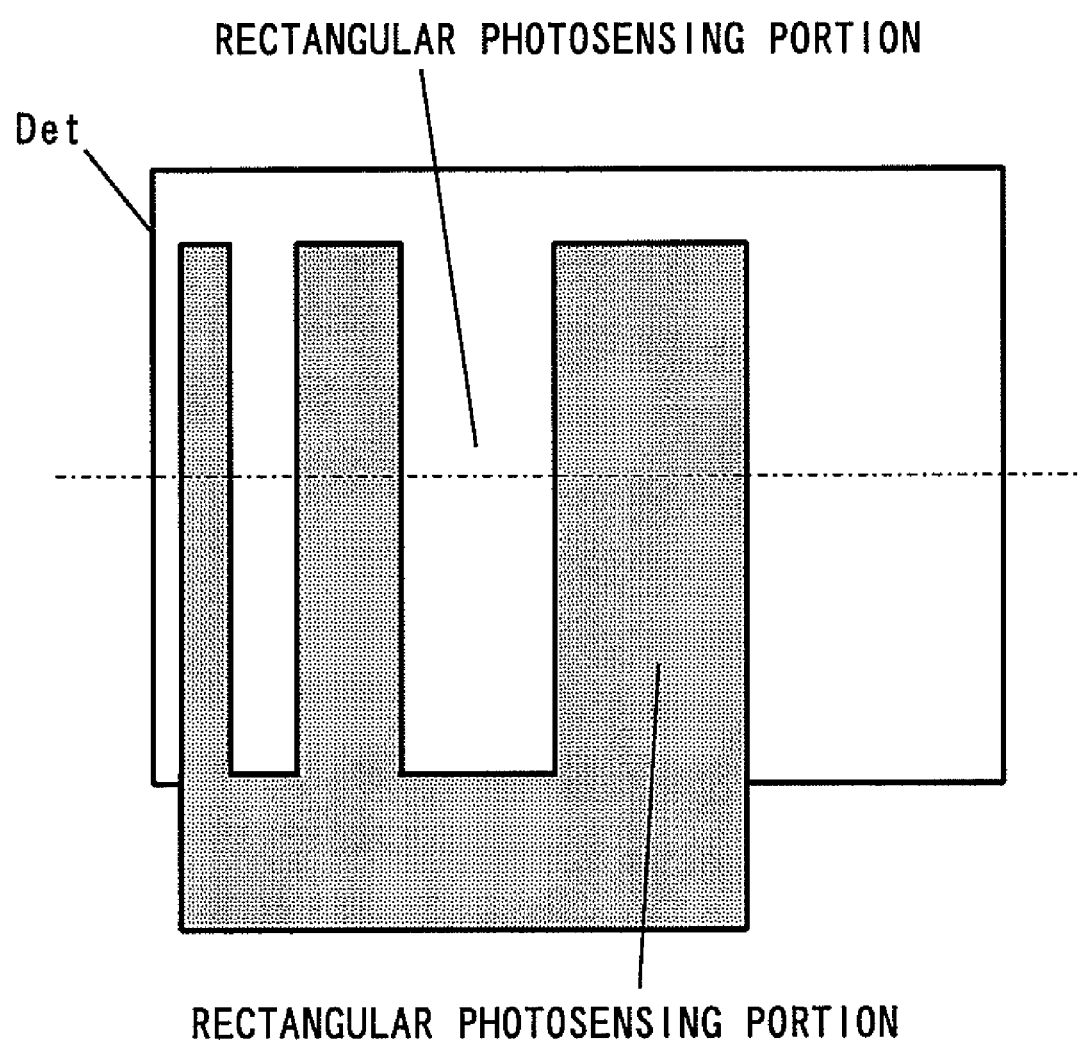
FIG. 37 Front view showing a photosensing element of a photodetector of a light deflecting device of another embodiment according to the invention.

It is not always necessary that all widths of the rectangular photosensing portions of the photosensing elements on the input and output sides are equal but those widths may be set to random widths depending on the locations as illustrated in FIG. 36 or may be gradually increased as illustrated in FIG. 37. A structure in which the widths or intervals of the rectangular photosensing portions are changed corresponds to a structure in which widths or heights of steps in the step-like angle characteristics as shown in the graphs are changed.

Figure 38:
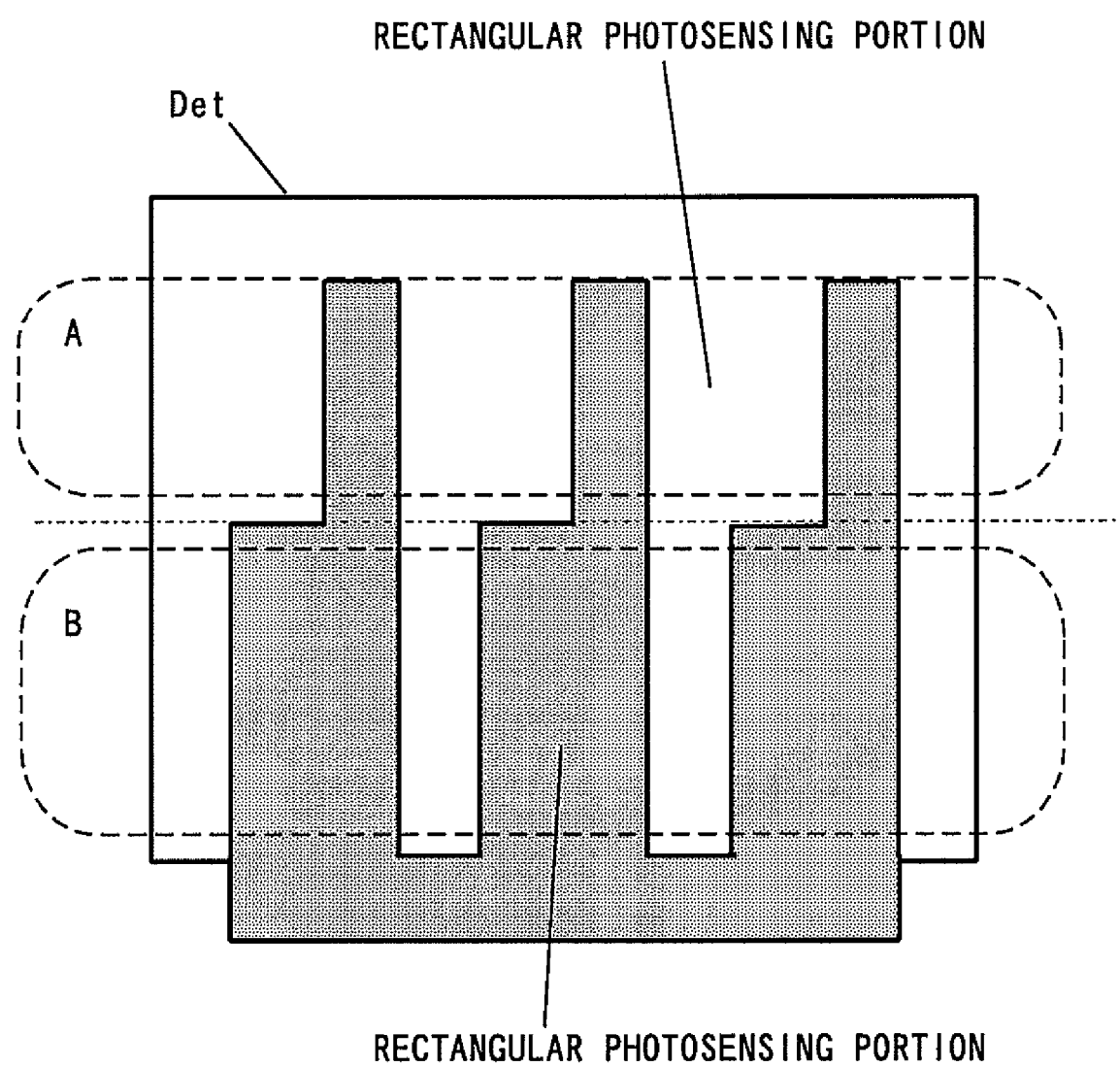
FIG. 38 Front view showing a photosensing element of a photodetector of a light deflecting device of another embodiment according to the invention.

Rectangular photosensing portions of a plurality of patterns can be also allowed to exist mixedly in the photosensing element Det as illustrated in FIG. 38. A pattern (having stairway-like widths) in a region of "A" and a pattern (having stairway-like widths) in a region of "B" are different as shown in the diagram. The photosensing element Det can be also used while the photosensing element Det is moved in the vertical direction or the position where the light spot drops is changed in accordance with circumstances.

Figure 39:
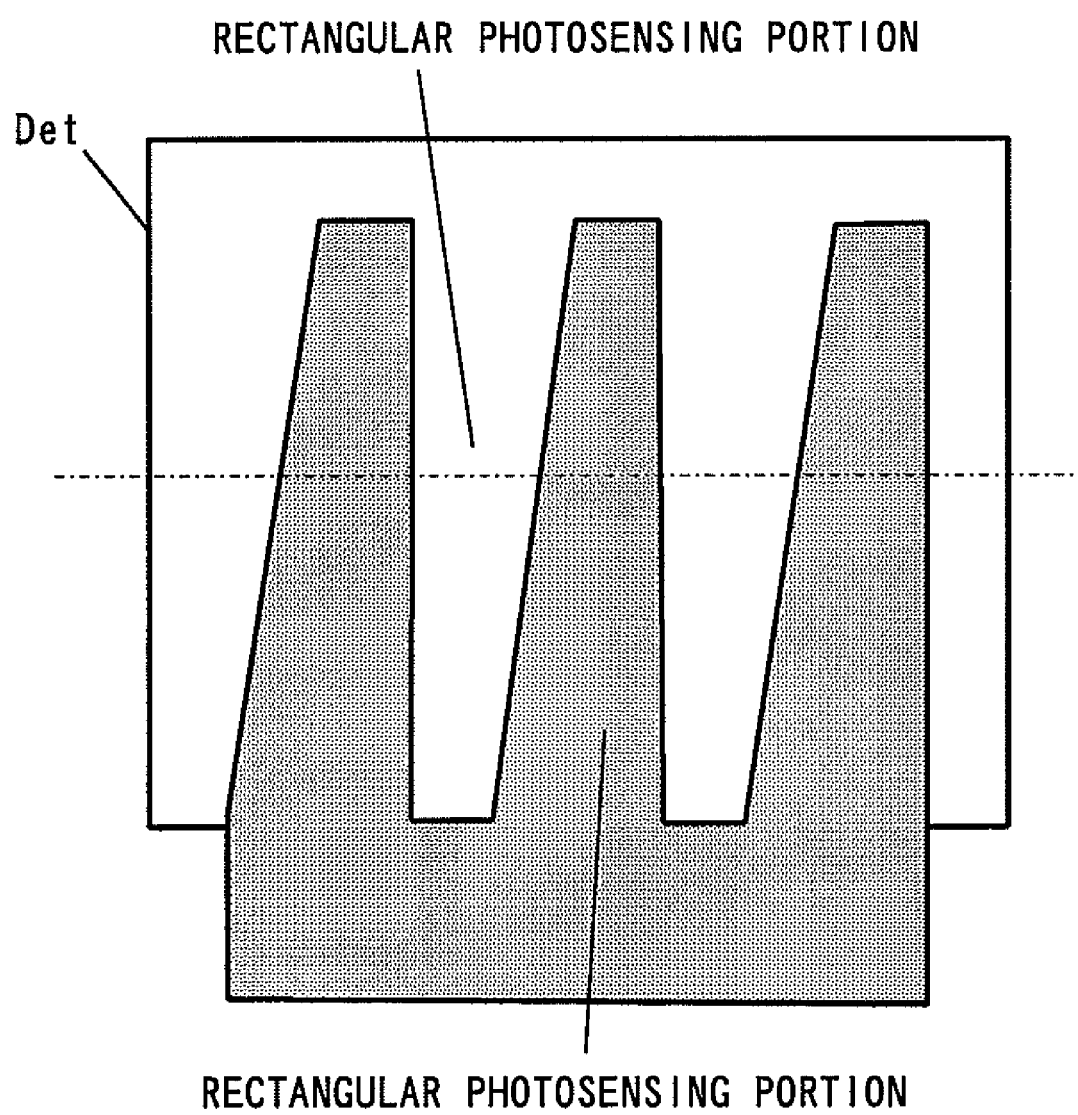
FIG. 39 Front view showing a photosensing element of a photodetector of a light deflecting device of another embodiment according to the invention.

Moreover, as illustrated in FIG. 39, a width of a pattern of a rectangular photosensing portion may be endlessly changed as an application of the above structures.

By changing the width or interval of each strip-shaped photosensing element Det as mentioned above, the widths or heights of steps of the angle characteristics which change in the step-like manner can be changed.

<Modification of Liquid Crystal Deflecting Elements>

In addition to the liquid crystal deflecting element LCDE in which the liquid crystal layer having the wedge-like cross section is sealed between the transparent electrodes as mentioned above, for example, the liquid crystal layer can also have refractive index distribution at its cross section.

Figure 40:
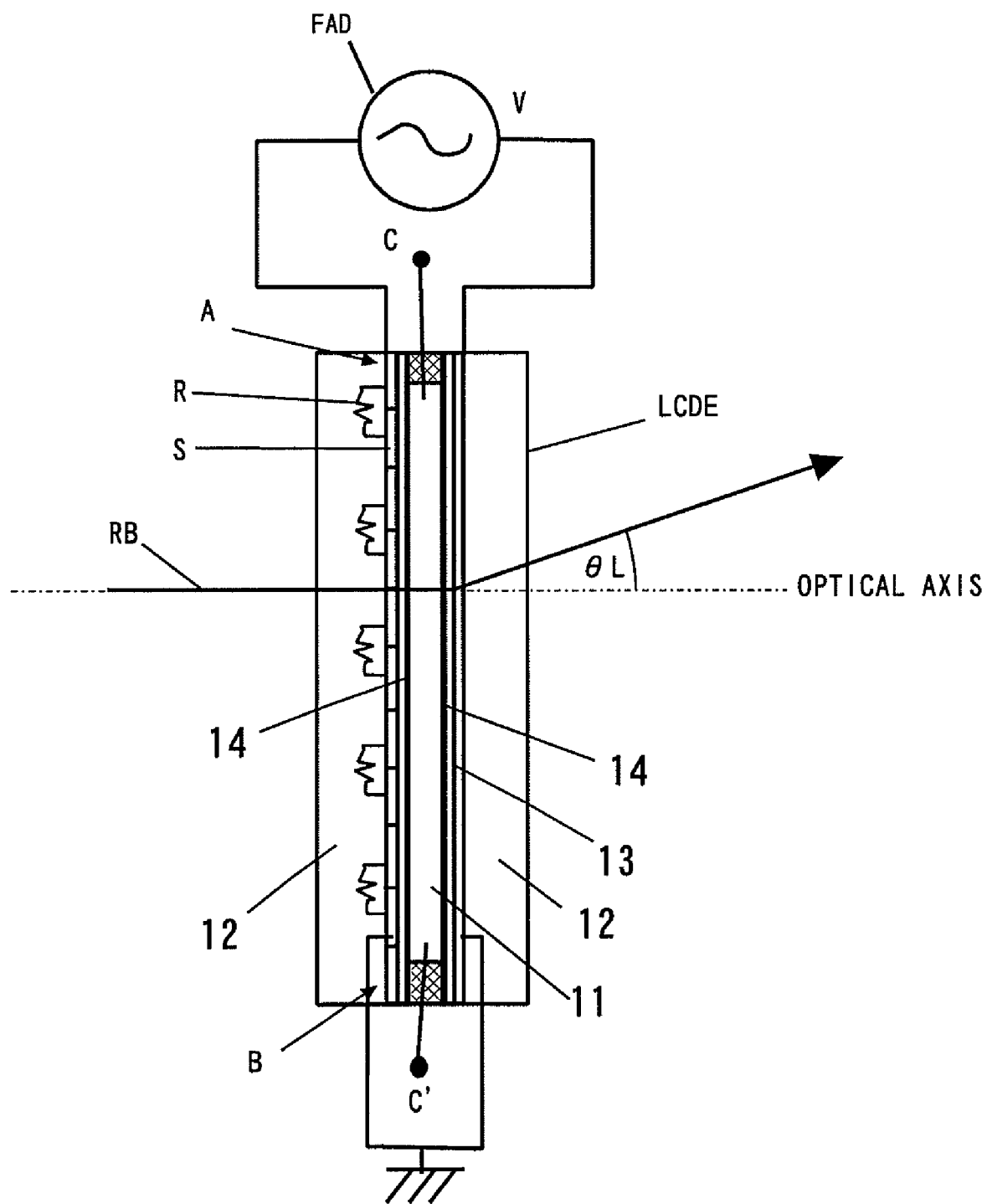
FIG. 40 Cross sectional view showing a liquid crystal deflecting element of a light deflecting device of another embodiment according to the invention.
Figure 41:
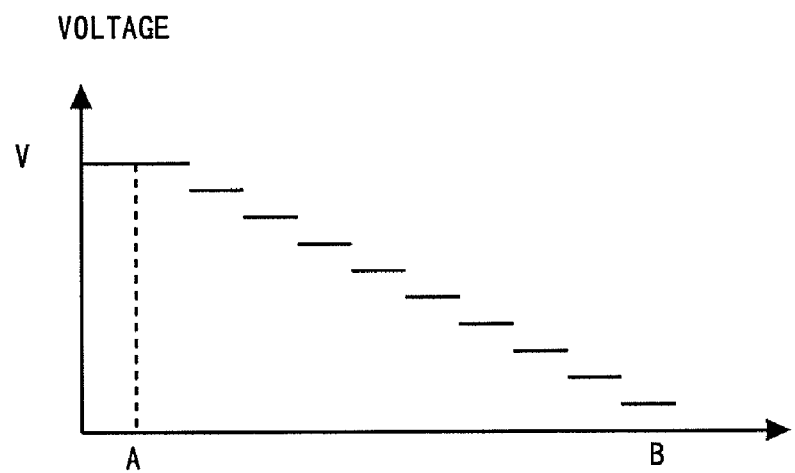
FIG. 41 Graph showing voltage distribution from the voltage applying side in an electrode of the liquid crystal deflecting element of the light deflecting device to the grounding side in another embodiment according to the invention.
Figure 42:
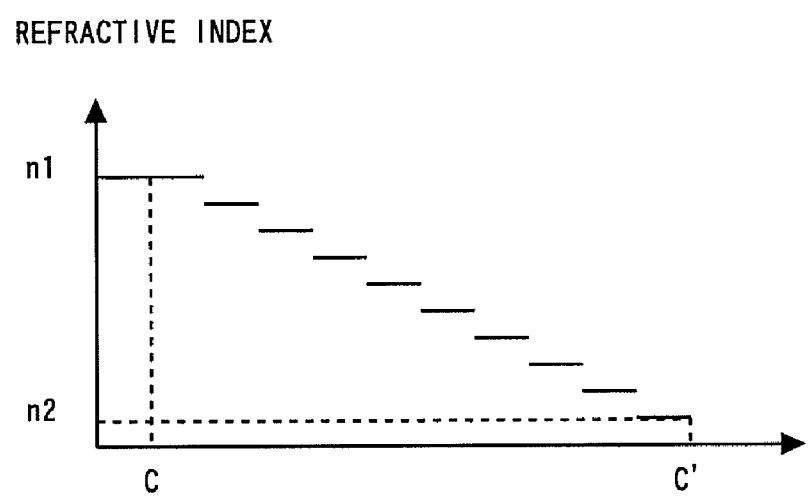
FIG. 42 Graph showing refractive index distribution of a liquid crystal layer corresponding to a region from the voltage applying side in an electrode of the liquid crystal deflecting element of the light deflecting device to the grounding side in another embodiment according to the invention.

For example, as shown in FIG. 40, the liquid crystal deflecting element LCDE is constructed in such a manner that its liquid crystal layer is set to a uniform thickness, electrodes of one of the sides which sandwich the liquid crystal layer are constructed by a plurality of independent strip electrodes S, and they are serially connected by predetermined resistors R. A plurality of rectangular transparent electrodes are juxtaposed as parallel patterns and a voltage is applied to an electrode A (voltage applying side) at one end thereof. By applying the voltage to a position A and connecting a position (grounding side) of an electrode B at the other end to the ground (or applying a voltage of a value different from that to the point A), voltage distribution V as shown in FIG. 41 is obtained between the electrodes A-B. Refractive index distribution n1-n2 between the liquid crystal layers C-C' is as shown in FIG. 42. Also in the construction, the function for deflecting the light beam can be provided.

Figure 43:
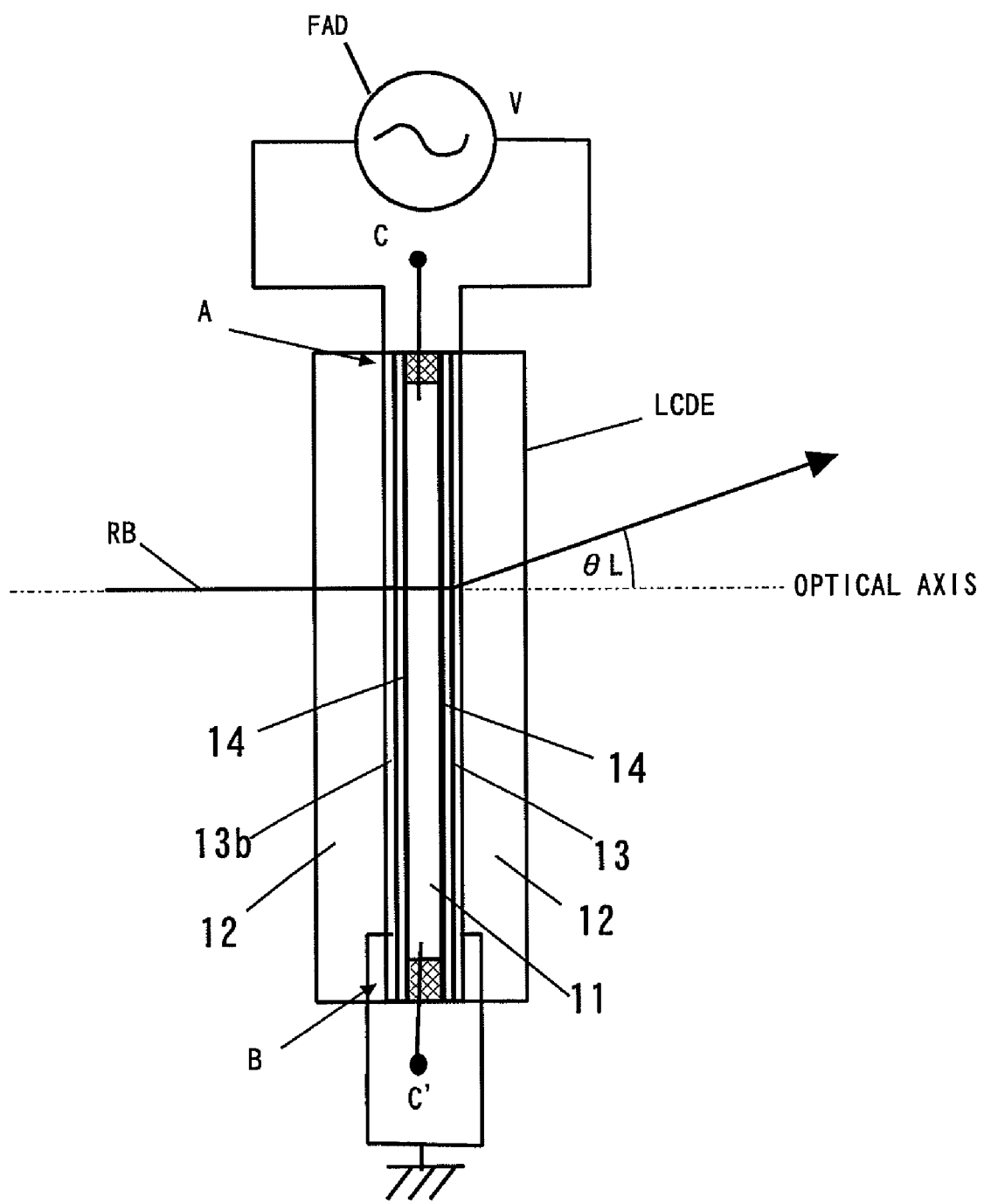
FIG. 43 Cross sectional view showing a liquid crystal deflecting element of a light deflecting device of another embodiment according to the invention.
Figure 44:
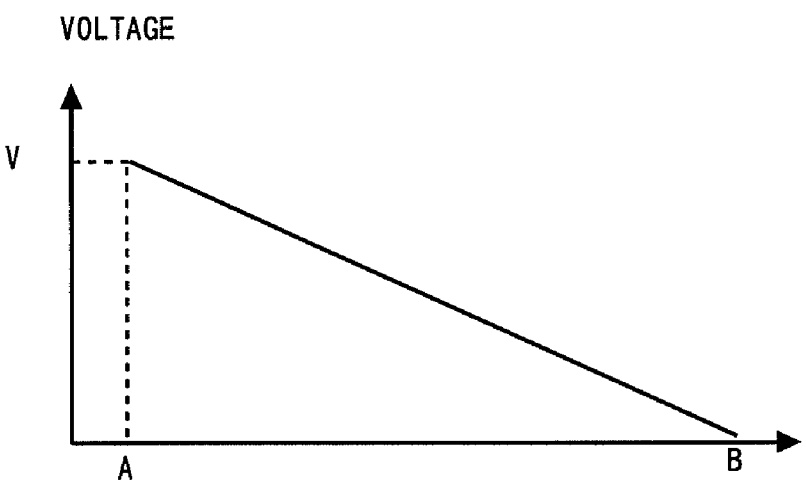
FIG. 44 Graph showing voltage distribution from the voltage applying side in an electrode of the liquid crystal deflecting element of the light deflecting device to the grounding side in another embodiment according to the invention.
Figure 45:
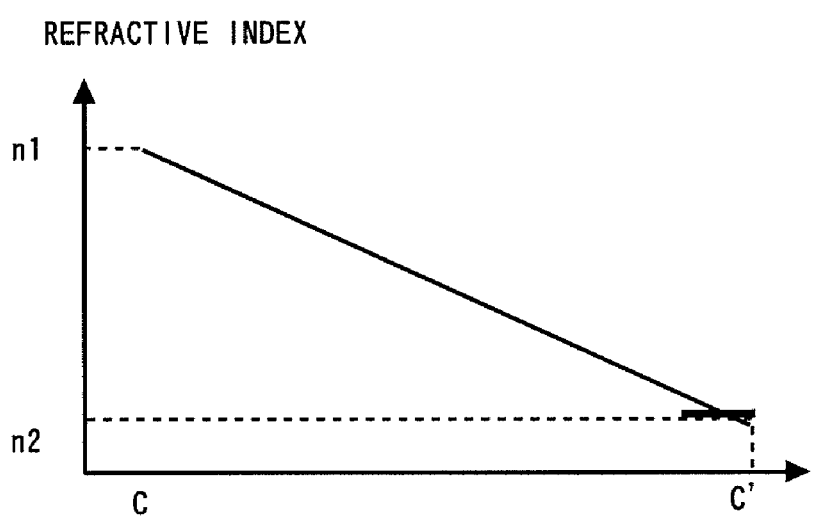
FIG. 45 Graph showing refractive index distribution of a liquid crystal layer corresponding to a region from the voltage applying side in an electrode of the liquid crystal deflecting element of the light deflecting device to the grounding side in another embodiment according to the invention.

As shown in FIG. 43, a similar effect will be obtained even if an electrode 13b in which a resistance value is continuously distributed between the electrode portions A-B is used in place of connecting a plurality of electrodes by the resistors. That is, the voltage distribution V as shown in FIG. 44 is obtained between the electrodes A-B and the refractive index distribution n1-n2 between the liquid crystal layers C-C' is as shown in FIG. 45. Also in the construction, the function for deflecting the light beam can be provided.

The invention claimed is:

1. A hologram device for recording or reproducing information to/from a hologram recording medium in which an optical interference pattern of reference light and signal light is held as a diffraction grating, comprising:
   a light forming section for splitting coherence light to form reference light and signal light modulated according to information to be recorded;
   an interfering section for mutually spatially separating an optical path of the reference light and an optical path of the signal light to allowing both the optical paths to intersect each other;
   a supporting portion for detachably supporting the hologram recording medium to an intersection point of the optical paths of the reference light and the signal light; and
   an image detecting section for receiving light diffracted from the diffraction grating of the hologram recording medium caused by an irradiated reference light thereto;
   wherein the interfering section includes a light deflecting device for irradiating the reference light to the hologram recording medium,
   wherein the light deflecting device includes
      a coarse motion light deflecting device having an optical system placed in the optical path of the reference light having at least two conjugate points on an optical axis thereof to deflect an input reference light beam for passing through a first conjugate point with a first deflection angle from the optical axis and entering a second conjugate point to be an output reference light beam;
      a fine motion light deflecting device of liquid crystal deflecting element which is arranged in the optical system of the coarse motion light deflecting device to apply a deflection to the input reference light beam entered thereinto so as to change the first deflection angle into a second deflection angle for a constant time;
      an input side photodetector for detecting a part of the reference light beam before entering the fine motion light to calculate a light input side signal which changes according to an angle of the reference light beam from the optical axis;
      an output side photodetector for detecting a part of the light beam after passing through the fine motion light deflecting device to calculate a light output side signal which changes according to an angle of the reference light beam from the optical axis; and
      a driving circuit electrically connected to the input and output side photodetectors and the fine motion light deflecting device to control a voltage which is applied to the fine motion light deflecting device on the basis of the light input side signal and the light output side signal, thereby changing the second deflection angle in a stair manner, wherein the driving circuit selects the angle direction of the reference light beam according to the information recorded or reproduced to/from the hologram recording medium.

2. A method for changing an angle of an output light beam to an optical axis of an optical system having at least two conjugate points on the optical axis by deflecting an input light beam, the method comprising:
   by a coarse motion light deflecting device having the optical system, deflecting the input light beam for passing through a first conjugate point with a first deflection angle from the optical axis and entering a second conjugate point to be the output light beam;
   by a fine motion light deflecting device of liquid crystal deflecting element which is arranged in the optical system, applying a deflection to the light beam entered thereinto so as to change the first deflection angle into a second deflection angle for a constant time;
   detecting a part of the light beam before entering the fine motion light deflecting device to an input side photodetector and calculating a light input side signal which changes according to an angle of the light beam from the optical axis;
   detecting a part of the light beam after passing through the fine motion light deflecting device to an output side photodetector and calculating a light output side signal which changes according to an angle of the light beam from the optical axis; and
   by a driving circuit electrically connected to the input and output side photodetectors and the fine motion light deflecting device, controlling a voltage which is applied to the fine motion light deflecting device on the basis of the light input side signal and the light output side signal, thereby changing the second deflection angle in a stair manner.

3. The method according to claim 2, wherein the fine motion light deflecting device applies the deflection so as to set the output light beam into a rest state for the constant time.

4. The method according to claim 2, wherein a galvano mirror is arranged at the first conjugate point to have a rotary axis which is located on the first conjugate point.

5. The method according to claim 2, wherein the fine motion light deflecting device of liquid crystal deflecting element is a transmitting type liquid crystal deflecting element or a reflecting type liquid crystal deflecting element.

6. The method according to claim 2, wherein the liquid crystal deflecting element is arranged at the second conjugate point of the optical system of the coarse motion light deflecting device.

7. The method according to claim 2, wherein the input side photodetector has a strip-shaped photosensing element.

8. The method according to claim 2, wherein the output side photodetector has a strip-shaped photosensing element.

9. The method according to claim 2, wherein the voltage to the fine motion light deflecting device is controlled so that the light output side signal is set to a constant value and, when a change in sign of the light input side signal is detected, the applied voltage is reset to an initial value.

* * * * *